(12) United States Patent
Craft et al.

(10) Patent No.: US 7,953,556 B2
(45) Date of Patent: May 31, 2011

(54) GEOPHONE NOISE ATTENUATION AND WAVEFIELD SEPARATION USING A MULTI-DIMENSIONAL DECOMPOSITION TECHNIQUE

(75) Inventors: Kenneth L. Craft, Missouri City, TX (US); Josef Paffenholz, Missouri City, TX (US)

(73) Assignee: Fairfield Industries Incorporated, Sugar Land, TX (US)

( * ) Notice: Subject to any disclaimer, the term of this patent is extended or adjusted under 35 U.S.C. 154(b) by 443 days.

(21) Appl. No.: 12/042,194

(22) Filed: Mar. 4, 2008

(65) Prior Publication Data

US 2008/0221801 A1    Sep. 11, 2008

Related U.S. Application Data

(60) Provisional application No. 60/893,906, filed on Mar. 9, 2007, provisional application No. 60/911,253, filed on Apr. 11, 2007.

(51) Int. Cl.
*G01V 1/28* (2006.01)
*G01R 13/00* (2006.01)

(52) U.S. Cl. .............. 702/17; 702/14; 702/66; 367/21; 367/43

(58) Field of Classification Search .............. 702/14–20, 702/103–107, 121–123, 188–190, 66; 367/21
See application file for complete search history.

(56) References Cited

U.S. PATENT DOCUMENTS

| 5,442,591 | A | * | 8/1995 | Dragoset et al. | ................. | 367/21 |
| 5,991,238 | A | * | 11/1999 | Barr | ................. | 367/62 |
| 6,021,090 | A | * | 2/2000 | Gaiser et al. | ................. | 367/15 |
| 6,721,662 | B2 | | 4/2004 | Wood | | |
| 6,832,161 | B1 | | 12/2004 | Moore | | |
| 7,356,410 | B2 | * | 4/2008 | Rode et al. | ................. | 702/2 |
| 2007/0294036 | A1 | * | 12/2007 | Strack et al. | ................. | 702/14 |
| 2009/0168599 | A1 | * | 7/2009 | Suarez et al. | ................. | 367/35 |

FOREIGN PATENT DOCUMENTS

GB     2 429 527     2/2007

OTHER PUBLICATIONS

ISA of PCT/US08/55816.*
PCT Search Report, Appn. No. PCT/US2008/055816, dated Jun. 30, 2009.
John Brittan et al., "Applications of adaptive noise attenuation to dual sensor seismic data," Expanded Abstracts, 73rd SEG Annual International Meeting, 2003: pp. 653-656.
Fred J. Barr et al., "Attenuation of Water-Column Reverberations Using Pressure and Velocity Detectors in a Water-Bottom Cable," Expanded Abstracts, 59th SEG Annual International Meeting, 1989: pp. 653-656.

(Continued)

*Primary Examiner* — Andrew Schechter
*Assistant Examiner* — Phuong Huynh
(74) *Attorney, Agent, or Firm* — Patterson & Sheridan, LLP

(57) ABSTRACT

Methods and apparatus for processing dual sensor (e.g., hydrophone and vertical geophone) data that includes intrinsic removal of noise as well as enhancing the wavefield separation are provided. The methods disclosed herein are based on a decomposition of data simultaneously into dip and frequency while retaining temporal locality. The noise removed may be mainly coherent geophone noise from the vertical geophone, also known as V(z) noise.

20 Claims, 40 Drawing Sheets

OTHER PUBLICATIONS

M. T. Taner et al., "Complex seismic trace analysis," Geophysics, Jun. 1979 vol. 44(6): pp. 1041-1063.

Andrew Shatilo et al., "Effect of Noise Suppression on Quality of 2C OBC Image," Expanded Abstracts, 74th SEG Annual International Exposition and Meeting, 2004: pp. 917-920.

Amal Ray et al., "First nodal OBS acquisition from the Thunder Horse Field in the deep water of the Gulf of Mexico," Expanded Abstracts, 74th SEG Annual International Exposition and Meeting, 2004: pp. 406-409.

Bill Dragoset et al., "Geophysical applications of adaptive-noise cancellation," Expanded Abstracts, 65th SEG Annual International Meeting, 1995: pp. 1389-1392.

Stéphane G. Mallat et al., "Matching Pursuits with Time-Frequency Dictionaries," IEEE Transactions on Signal Processing, Dec. 1993 vol. 41(12): pp. 3397-3415.

J. Paffenholz et al., "Shear Wave Noise on OBS Vz Data—Part II Elastic Modeling of Scatterers in the Seabed," Expanded Abstracts, 68th EAGE Conference & Exhibition, Jun. 2006: pp. A72-A76.

James E. Gaiser, "Vector-fidelity benefits of buried OBC detectors at Teal South," 74th SEG International Exposition and Annual Meeting, Oct. 2004: pp. 913-916.

J. Morlet et al., "Wave propagation and sampling theory—Part II: Sampling theory and complex waves," Geophysics, Feb. 1982 vol. 47(2): pp. 222-236.

* cited by examiner

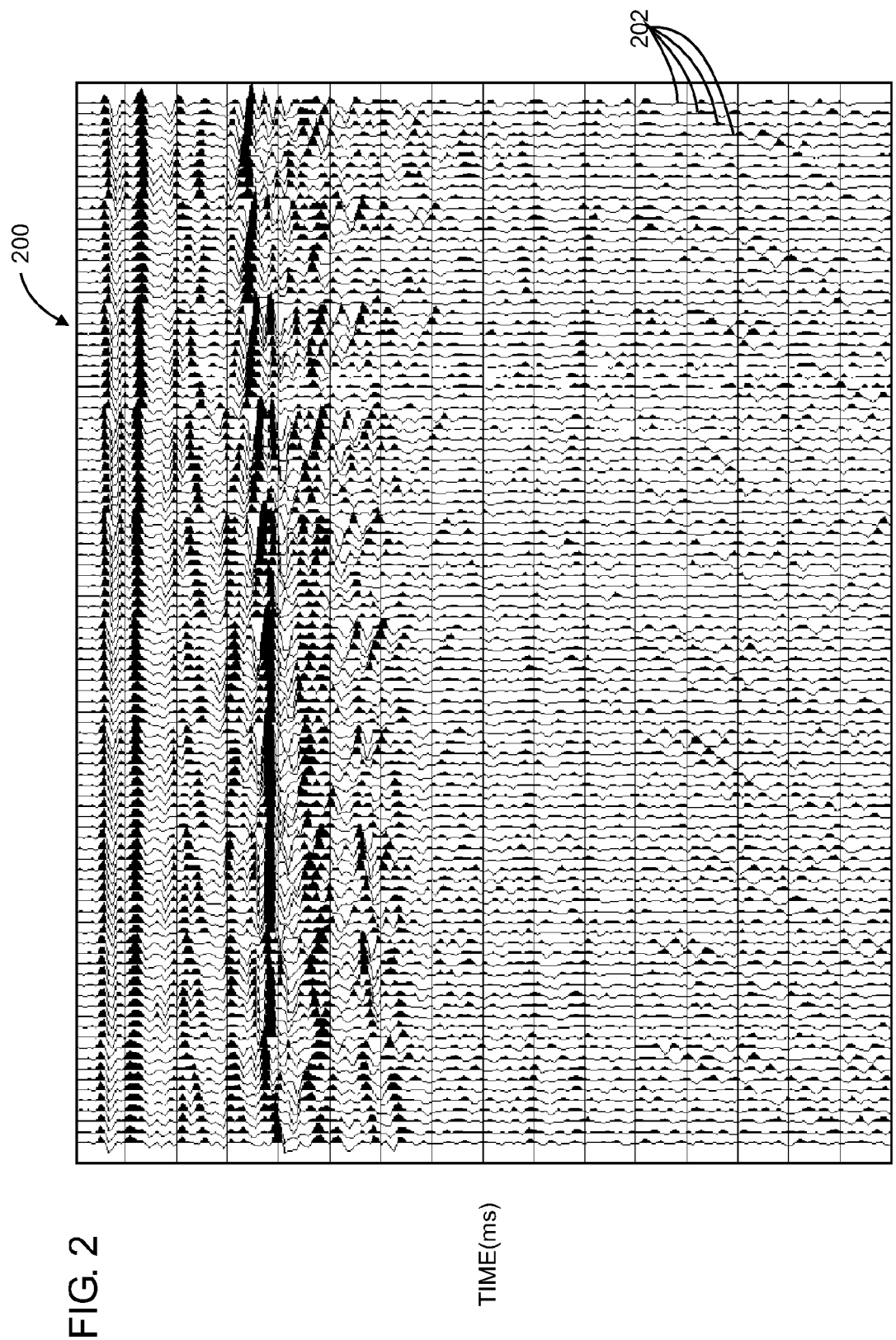

TIME(ms)

TIME(ms)

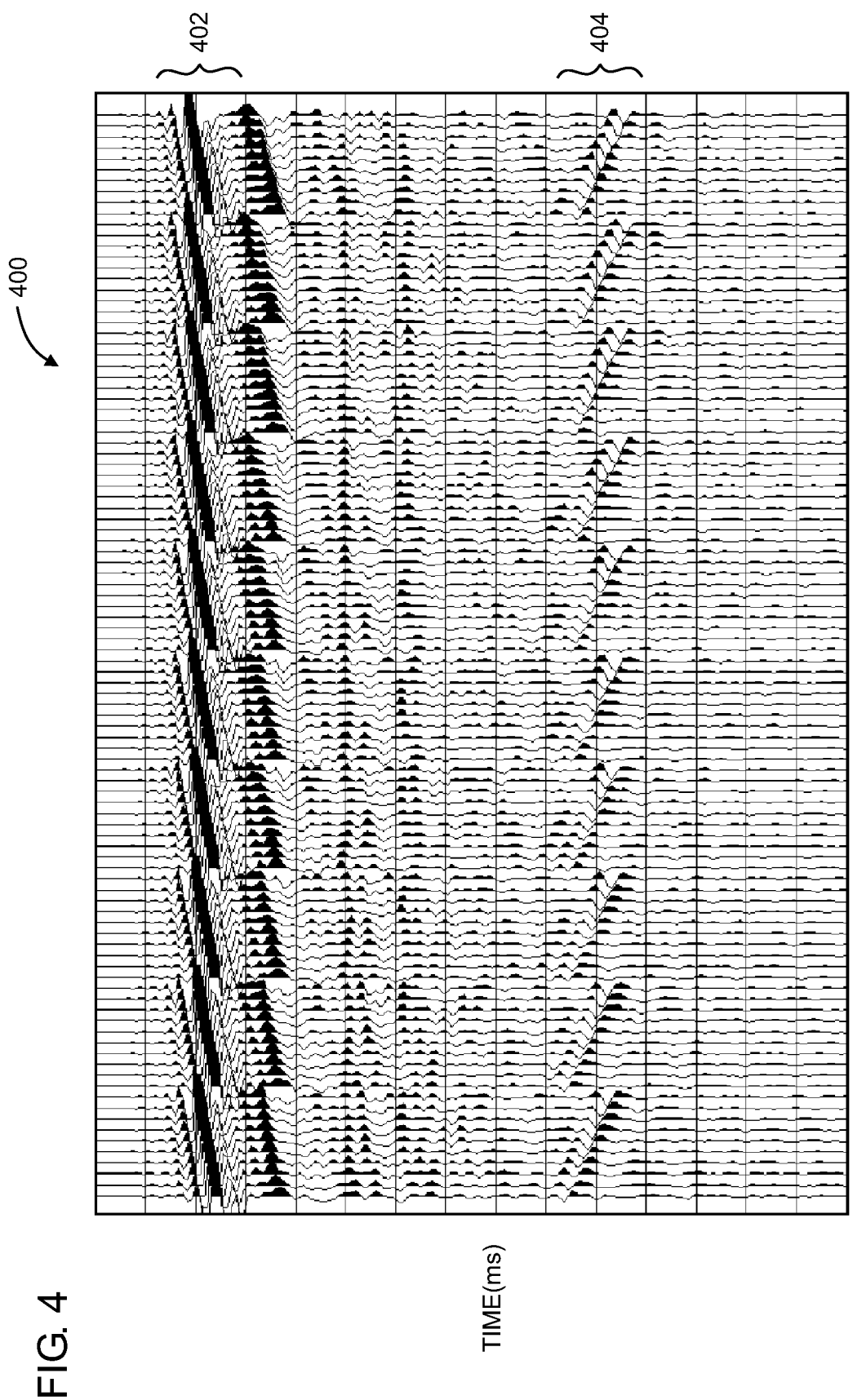

TIME(ms)

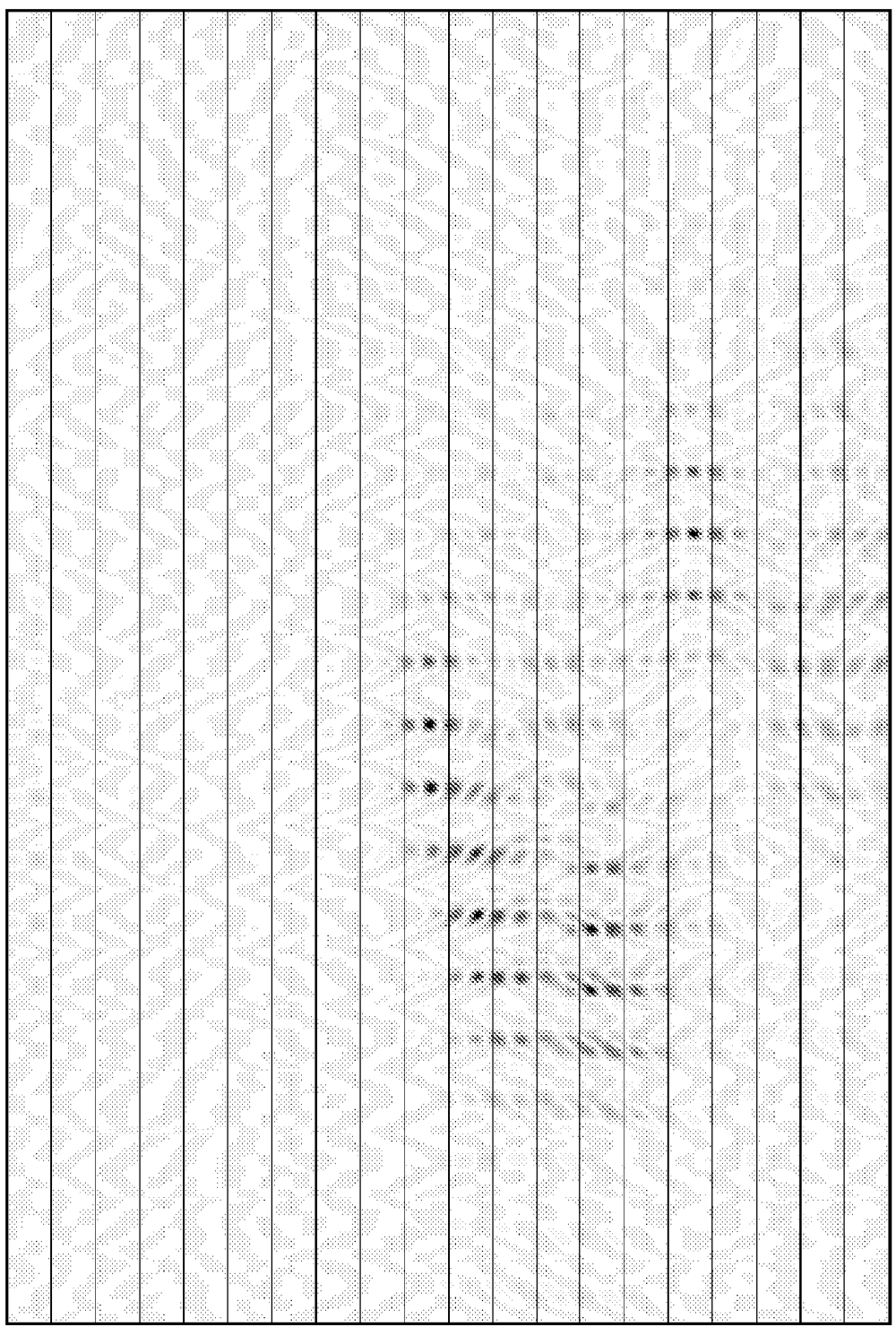

TIME(ms)

TIME(ms)

TIME(ms)

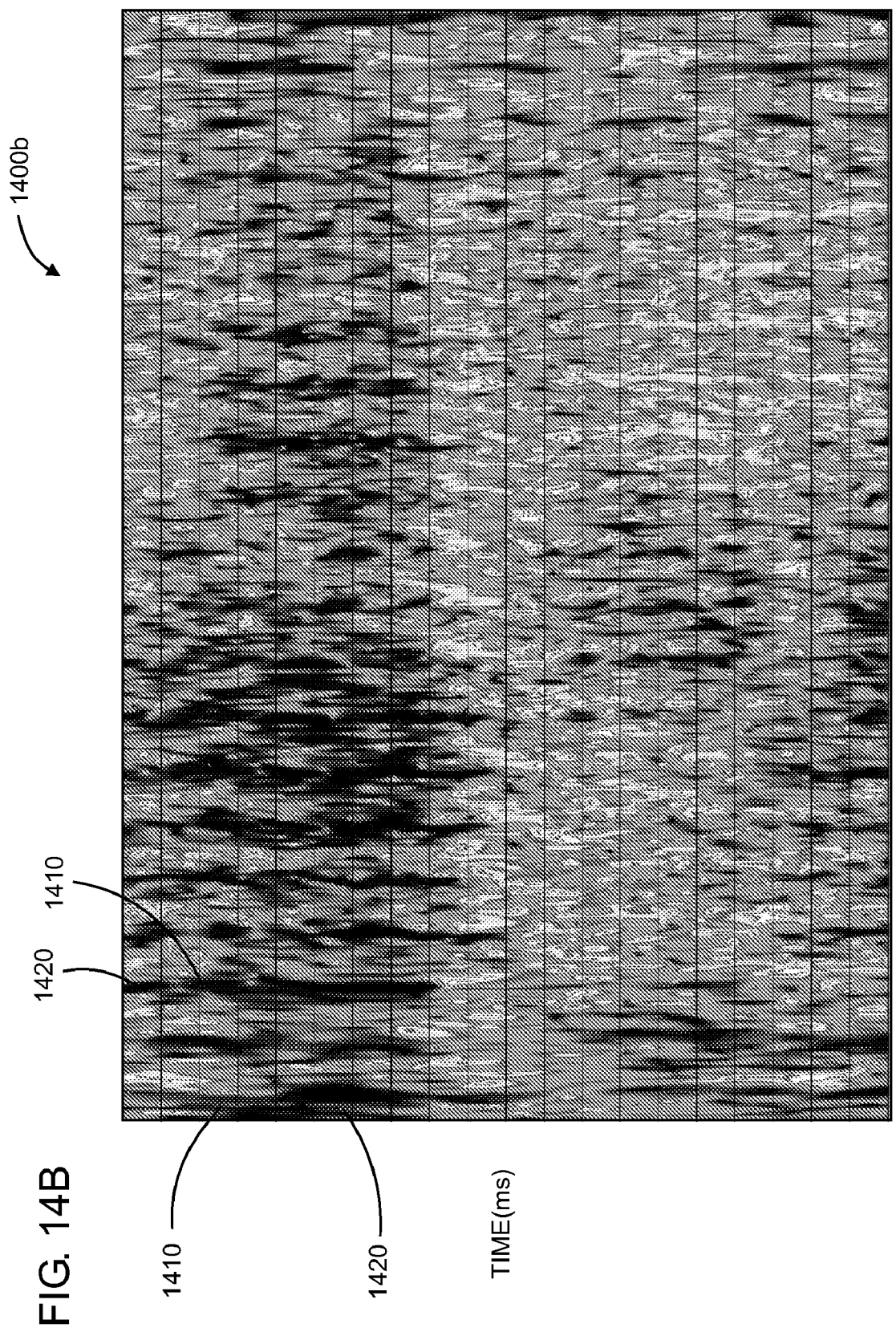

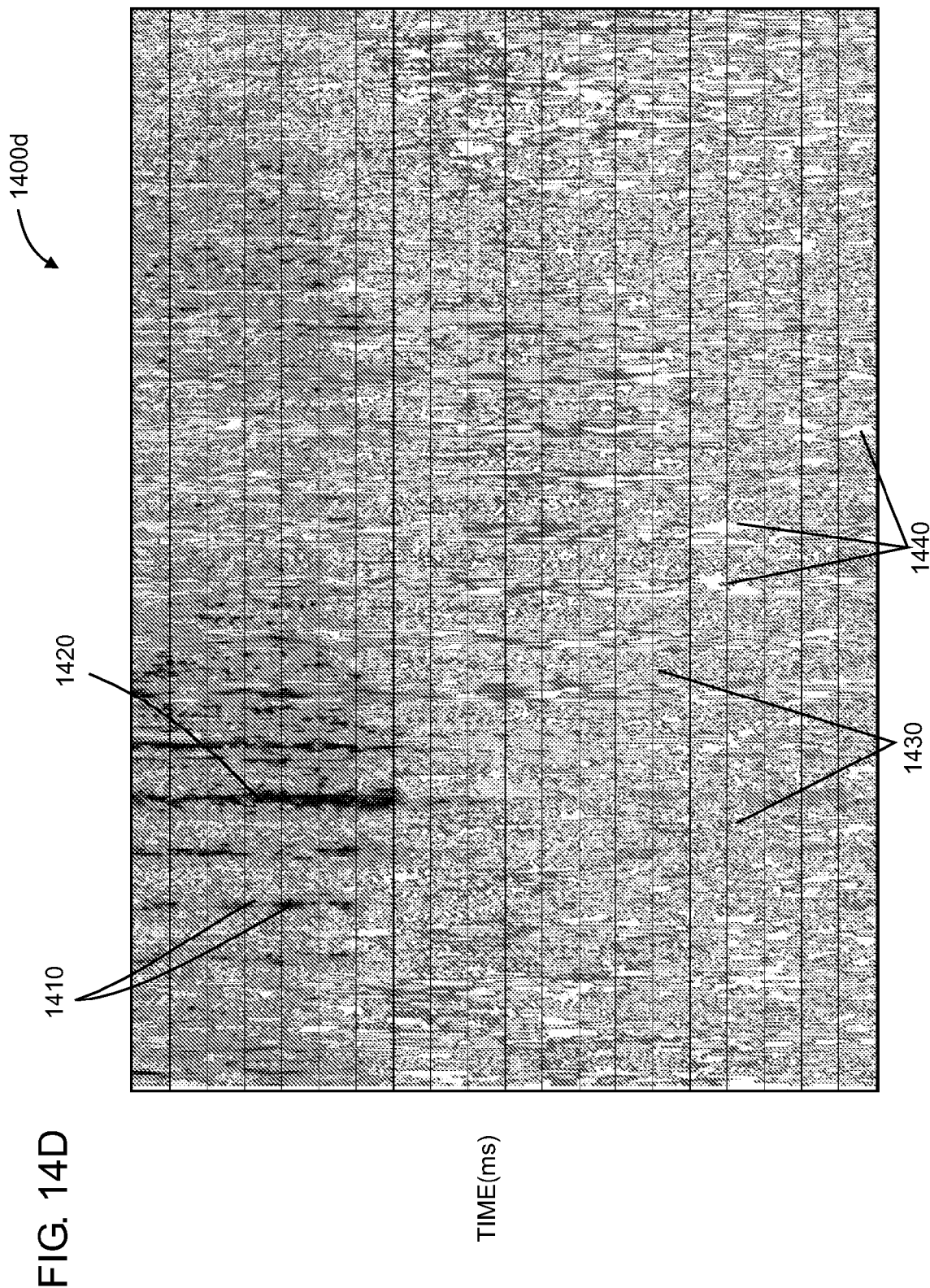

TIME(ms)

TIME(ms)

GEOPHONE NOISE ATTENUATION AND WAVEFIELD SEPARATION USING A MULTI-DIMENSIONAL DECOMPOSITION TECHNIQUE

CROSS-REFERENCE TO RELATED APPLICATIONS

This application claims benefit of U.S. Provisional Patent Application Ser. No. 60/893,906 filed Mar. 9, 2007 and U.S. Provisional Patent Application Ser. No. 60/911,253 filed Apr. 11, 2007, which are herein incorporated by reference.

BACKGROUND OF THE INVENTION

1. Field of the Invention

Embodiments of the present invention generally relate to techniques for processing seismic data and, more particularly, to removing noise and separating the wavefields into up- and down-going elements from geophone and hydrophone gathers.

2. Description of the Related Art

In the oil and gas industry, seismic surveys are one of the most important techniques for discovering the presence of subterranean hydrocarbon deposits. If the data is properly processed and interpreted, a seismic survey can provide geologists with a two-dimensional (2-D) or three-dimensional (3-D) representation of subsurface lithologic formations and other features, so that they may better identify those formations likely to contain oil and/or gas. Having an accurate representation of an area's subsurface lithologic formations can increase the odds of hitting an economically recoverable reservoir when drilling and decrease the odds of wasting money and effort on a nonproductive well.

A seismic survey is conducted by deploying an array of energy sources and an array of receivers in an area of interest. Typically, vibrator trucks are used as sources for land surveys, and air guns are used for marine surveys. The sources are discharged in a predetermined sequence, sending a downgoing seismic wavefield or signal into the earth that is partially reflected by subsurface seismic reflectors (i.e., interfaces between subsurface lithologic or fluid units having different elastic properties). The reflected or up-going wavefield or signals (known as "seismic reflections") are then detected and converted to electrical signals by the array of receivers located at or near the surface of the earth, at or near the water surface, or at or near the seafloor.

Each receiver records the amplitude of the incoming signals over time at the receiver's particular location, thereby generating a seismic survey of the subsurface. The seismic energy recorded by each seismic receiver for each source activation during data acquisition is generally referred to as a "trace." The seismic receivers utilized in such operations typically include pressure sensors, such as hydrophones, and velocity sensors, such as single or multi-component geophones. Since the physical location of the sources and receivers is known, the time it takes for a reflection wave to travel from a source to a sensor is directly related to the depth of the formation that caused the reflection. Thus, the recorded signals, or seismic energy data, from the array of receivers can be analyzed to yield valuable information about the depth and arrangement of the subsurface formations, some of which hopefully contain oil or gas accumulations.

This analysis typically begins by organizing the data from the array of receivers into common geometry gathers, where data from a number of receivers that share a common geometry are analyzed together. A gather will provide information about a particular location or profile in the area being surveyed. Ultimately, the data will be organized into many different gathers and processed before the analysis is completed in an effort to map the entire survey area. The types of gathers typically employed include common midpoint (i.e., the receivers and their respective sources share a common midpoint), common source (i.e., the receivers share a common source), common offset (i.e., the receivers and their respective sources have the same separation or "offset"), and common receiver (i.e., a number of sources share a common receiver).

The data in a gather is typically recorded or first assembled in the time-offset domain. That is, the seismic traces recorded in the gather are assembled or displayed together as a function of offset (i.e., the distance of the receiver from a reference point) and of time. The time required for a given signal to reach and be detected by successive receivers is a function of its velocity and the distance traveled. Those functions are referred to as kinematic travel time trajectories. Thus, at least in theory, when the gathered data is displayed in the time-offset domain (the T-X domain), the amplitude peaks corresponding to reflection signals detected at the receivers should align into patterns that mirror the kinematic travel time trajectories. It is from those trajectories that one ultimately may determine an estimate of the depths at which formations exist.

A number of factors, however, make the practice of seismology and, especially, the interpretation of seismic data much more complicated than its basic principles. Primarily, the up-going reflected signals that indicate the presence of subsurface lithologic formations are typically inundated with various types of noise. The most meaningful signals are the so-called primary reflection signals, those signals that travel down to the reflective surface and then back up to a receiver. When a source is discharged, however, a portion of the signal travels directly to receivers without reflecting off of any subsurface features. In addition, a signal may bounce off of a subsurface feature, bounce off the surface, and then bounce off the same or another subsurface feature, one or more times, creating so-called multiple reflection signals. Other portions of the detected signal may be noise from ground roll, refractions, and unresolvable scattered events. Some noise, both random and coherent, may be generated by natural and man-made events outside the control of the survey, such as wind noise.

All of this noise is detected along with the reflection signals that indicate subsurface features. Thus, the noise and reflection signals tend to overlap when the survey data is displayed in T-X space. The overlap can mask primary reflection signals, the so-called seismic events, and make it difficult or impossible to identify patterns in the display upon which inferences about subsurface geological strata may be drawn. Accordingly, various mathematical methods have been developed to process seismic data in such a way that noise is separated from primary reflection signals.

Many such methods seek to achieve a separation of signal and noise by transforming the data from the T-X domain to other domains, such as the frequency-wavenumber (F-K) or the time-slowness (tau-P) domains, where there is less overlap between the signal and noise data. Once the data is transformed, various mathematical filters are employed to the transformed data to eliminate as much of the noise as possible in an effort to enhance the primary reflection signals. The data is then inverse transformed back into the T-X domain for interpretation or further processing. For example, so-called Radon filters are commonly used to attenuate or remove multiple reflection signals. Such methods rely on Radon transformation equations to transform data from the T-X domain to the tau-P domain where it can be filtered. More specifically, the T-X data is transformed along kinematic travel time trajectories having constant velocities and slownesses, where slowness p is defined as the reciprocal of velocity (p=1/v).

As another example of addressing noise, the combination of dual sensor (hydrophone and vertical geophone) data has long been used as a technique for attenuating ghost reflections from the air water interface. The fundamental concept is that up-going and down-going waves are measured differently by a velocity sensor while direction of progression of the wave has no polarity significance to the hydrophone. At its simplest, dual sensor processing for ghost elimination consists of simply summing recordings made with co-located hydrophones and geophones placed on the sea floor. It has been shown that, for a vertical wave path, a scalar can be applied to one of the two sensors to account for bottom reflectivity and suppress water layer reverberations (see Barr, F. J., and J. I. Sanders, "Attenuation of water-column reverberations using pressure and velocity detectors in a water-bottom cable," 59th Annual International Meeting, SEG, Expanded Abstracts, pp. 653-656, 1989). Additional corrections are required when the geophone is not firmly coupled with the ocean bottom or there is significant reflectivity in the earth directly and immediately below the position of the sensor. Also, the geophone provides attenuated amplitude sensitivity to waves arriving at the sensor package in a direction other than its presumably vertical orientation while the hydrophone shows indifference to angle of arrival.

Perhaps the largest single obstacle to overcome in wavefield separation of P-Z data is the presence of noise energy (non p-wave specific) on the geophone that is not present on the hydrophone. This noise is observed to some degree on bottom referenced dual sensor data worldwide. It appears to be more severe when near bottom characteristics are more complex or varied. In general, the noise manifests as coherent energy on common receiver gathers with moveout characteristics of converted wave velocity, and with relatively random phase and amplitude on shot gathers. This energy has often been associated with acquisition integrity related issues, such as coupling and phone orientation.

Only recently, alternative explanations have been developed that describe a mechanism that will produce exactly the same type of energy (see Paffenholz, J., P. Docherty, R. Shurtleff, and D. Hays, "Shear wave noise on OBS vz data— Part II: Elastic modeling of scatterers in the seabed," $68^{th}$ Conference and Exhibition, EAGE, Expanded Abstracts, B046/B047, 2006). This description explains a physical phenomenon that produces the described characteristics: high amplitude excitation of the particle motion sensed by vertical geophone with virtually no significant energy observed by the hydrophone. This noise, hereinafter referred to as "V(z) noise," often is so severe that without adequate tools for removal, the advantages of dual-component ocean bottom acquisition are practically nullified. V(z) noise occurs in both cable data (see Gaiser, J, "Vector-fidelity benefits of buried OBC detectors at Teal South," $74^{th}$ Annual Meeting, SEG, pp. 913-916, 2004) and node-type data (see Ray, A., B. Nolte, and D. Herron, "First nodal OBC acquisition from the Thunder Horse Field in the deep water of the Gulf of Mexico," $74^{th}$ Annual International Meeting, SEG, pp. 406-409, 2005). Often large in amplitude, V(z) noise can degrade P-Z summation and differencing and subsequent imaging, thus stimulating techniques for its removal (see Shatilo, A. P., R. E. Duren, and T. Rape, "Effect of noise suppression on quality of 2C OBC image," $74^{th}$ Annual International Meeting, SEG, Extented Abstracts, pp. 917-920, 2004, hereinafter referred to as Shatilo et al.). Observed characteristics of the noise include exhibiting converted wave moveout, being very weak or absent on the hydrophone, and being coherent on a receiver record, but random on a shot record (i.e., is not repeatable on closely spaced geophones).

The non-velocity filtering methods seek to exploit the fact that the hydrophone signal is not affected by anything like the V(z) noise. However, since up-going and down-going waves have different polarity relationships on hydrophone and geophone, previous methods have used water layer reverberation models to separate signal from noise (see Dragoset, B, "Geophysical applications of adaptive-noise cancellation," $65^{th}$ Annual International Meeting, SEG, Expanded Abstracts, pp. 1389-1392, 1995 and Brittan, J., and J. Starr, "Applications of adaptive noise attenuation to dual sensor seismic data," $73^{rd}$ Annual International Meeting, SEG, Expanded Abstracts, pp. 653-656, 2003). Use of a depth dependent modeled multiple period in any V(z) noise elimination technique introduces a 1-D approximation which makes it inappropriate in complex water bottom and subsurface environments and progressively incorrect as a function of increasing angle arrival of energy at the phone.

Shatilo et al. (2004) give an overview of previous attempts to solve the V(z) noise problem. They are quite successful with F-K based velocity filtering in the common receiver domain. This technique makes the often valid assumption that complete dip separation of primary and noise energy can be achieved on a receiver gather record through application of normal moveout corrections. With significant geologic complexity, both p-wave signal and the noise exciting shear wave will appear at a broad range of dip, necessitating a different decomposition approach. Additionally, F-K velocity filter will often suffer from spatial aliasing.

Accordingly, what is needed is an improved method of processing dual sensor data such that meaningful geophone data may be extracted.

SUMMARY OF THE INVENTION

Embodiments of the present invention provide techniques for processing dual sensor (hydrophone and vertical geophone) data, particularly in deep water, in an effort to remove noise and enhance the wavefield separation.

One embodiment of the present invention is a method for extracting wavefields from a hydrophone gather and a geophone gather. The method generally includes windowing the hydrophone and geophone gathers; performing a three-dimensional (3-D) time-slowness (tau-P) transform on each of the windowed gathers; dividing each tau-P transform into N frequency bands to form N hydrophone frequency bands and N geophone frequency bands; determining an envelope of each frequency band for the N hydrophone frequency bands and for the N geophone frequency bands; determining an envelope ratio for each frequency band, wherein the envelope ratio for the Nth frequency band is a ratio of the envelope for the Nth hydrophone frequency band to the envelope for the Nth geophone frequency band; scaling each of the geophone frequency bands by the corresponding envelope ratio for each frequency band; summing the scaled geophone frequency bands; and performing an inverse tau-P transform on the summed, scaled geophone frequency bands.

Another embodiment of the present invention is a method for extracting wavefields from a hydrophone gather and a geophone gather. The method generally includes windowing the hydrophone and geophone gathers to form pairs of corresponding hydrophone and geophone windowed gathers, performing certain operations for each pair of corresponding hydrophone and geophone windowed gathers, and combining the inverse-transformed windowed geophone gathers. The operations generally include performing a 3-D tau-P transform on each of the windowed gathers; dividing each tau-P transform into N frequency bands to form N hydrophone frequency bands and N geophone frequency bands; determining an envelope of each frequency band for the N hydrophone frequency bands and for the N geophone frequency bands; determining an envelope ratio for each frequency band, wherein the envelope ratio for the Nth frequency band is a ratio of the envelope for the Nth hydrophone frequency band to the envelope for the Nth geophone frequency band; scaling each of the geophone frequency bands by the corresponding envelope ratio for each frequency band; summing the scaled geophone frequency bands; and performing an inverse tau-P transform on the summed, scaled geophone frequency bands.

Yet another embodiment of the present invention provides a computer-readable medium containing a program for extracting wavefields from a hydrophone gather and a geophone gather, which, when executed by a processor, performs operations. The operations generally include windowing the hydrophone and geophone gathers; performing a 3-D tau-P transform on each of the windowed gathers; dividing each tau-P transform into N frequency bands to form N hydrophone frequency bands and N geophone frequency bands; determining an envelope of each frequency band for the N hydrophone frequency bands and for the N geophone frequency bands; determining an envelope ratio for each frequency band, wherein the envelope ratio for the Nth frequency band is a ratio of the envelope for the Nth hydrophone frequency band to the envelope for the Nth geophone frequency band; scaling each of the geophone frequency bands by the corresponding envelope ratio for each frequency band; summing the scaled geophone frequency bands; and performing an inverse tau-P transform on the summed, scaled geophone frequency bands.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 2 is an exemplary hydrophone gather for a common receiver configuration, in accordance with an embodiment of the present invention.

FIG. 4 illustrates an exemplary shallow window from a hydrophone, which contains direct arrival (down-going) at approximately 1200 ms and another signal that is all up-going in accordance with an embodiment of the present invention.

FIGS. 10A-D illustrate frequency bands 1 through 4 after dividing the hydrophone tau-P space of FIG. 8 into four frequency bands, in accordance with embodiments of the present invention.

FIGS. 14A-D illustrate envelope ratios of the envelopes of the frequency bands of FIGS. 12A-D for the hydrophone to the envelopes of the corresponding frequency bands of FIGS. 13A-D for the geophone, in accordance with embodiments of the present invention.

DETAILED DESCRIPTION

Figure 1:
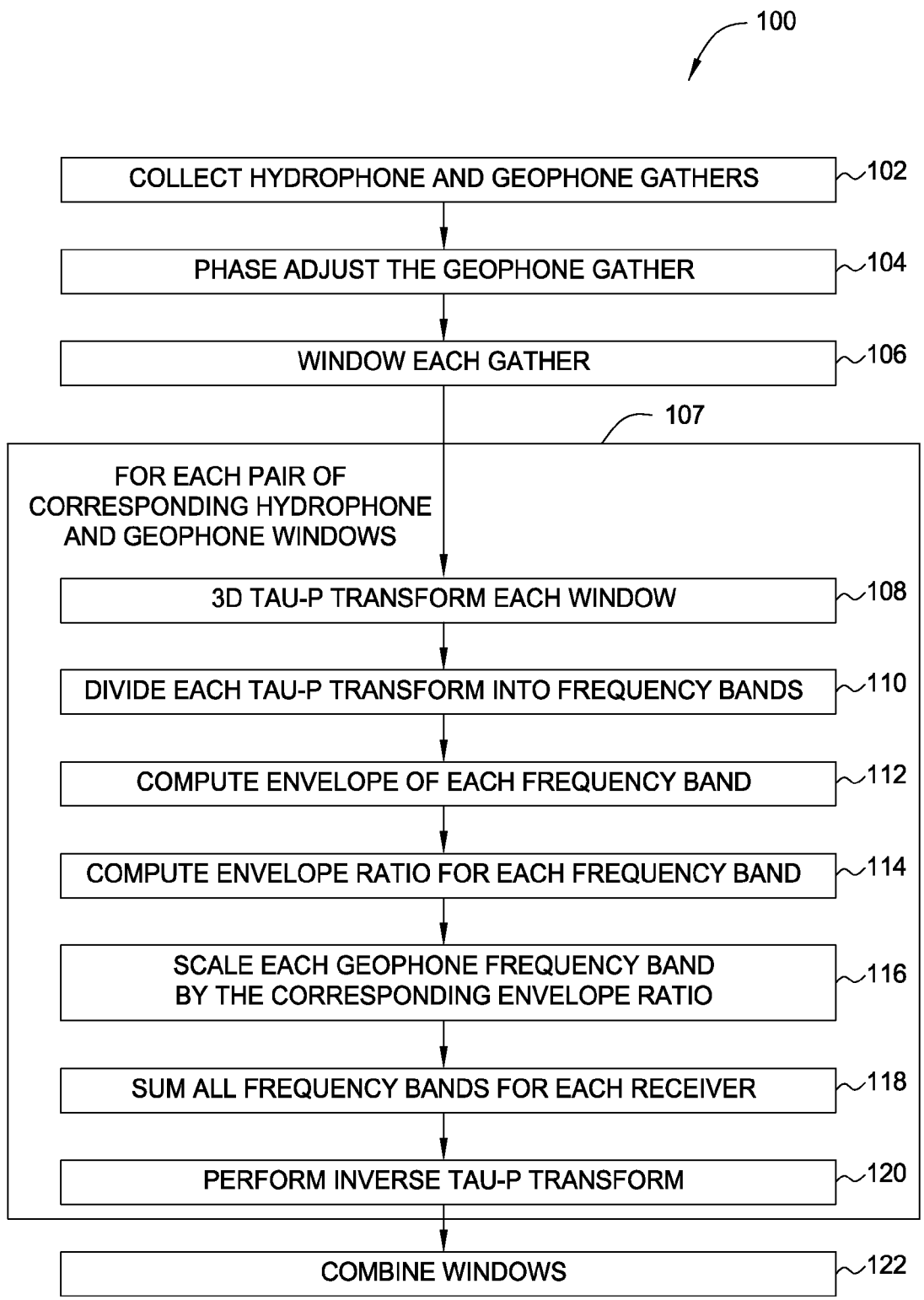
FIG. 1 is a flow diagram illustrating exemplary operations for enhanced wavefield separation, in accordance with an embodiment of the present invention.

Embodiments of the present invention provide methods and apparatus for processing dual sensor (e.g., hydrophone and vertical geophone) data that includes intrinsic removal of noise as well as enhancing the wavefield separation. The methods disclosed herein are based on a decomposition of data simultaneously into dip and frequency while retaining temporal locality. The noise removed may be mainly coherent geophone noise from the vertical geophone, or V(z) noise, and the effects may be most noticeable for deep water gathers.

Paffenholz et al., herein incorporated by reference, show that the V(z) noise is not caused by deficiencies in the instrumentation pod as has sometimes been assumed, but is a true recording of shot-generated seafloor undulations (see Paffenholz, J., P. Docherty, R. Shurtleff, and D. Hays, "Shear wave noise on OBS vz data—Part II: Elastic modeling of scatterers in the seabed," 68$^{th}$ Conference and Exhibition, EAGE, Expanded Abstracts, B046/B047, 2006a). Since the V(z) noise issue cannot be resolved by improving the geophone recording, the V(z) noise may have to be addressed in signal processing.

The fundamental assumption employed in this technique is that all pressure wave signal energy may be adequately represented on the hydrophone recording. Any energy on the geophone that is inconsistent with energy on the hydrophone is generally either undesirable or attenuated through coupling or obliquity. Based on this assumption, the goal is a method of decomposing the energy of the hydrophone and geophone that allows every constituent part of coherent energy to be compared between the two receiver types and an objective decision made on whether to keep or modify the geophone content to be a sensible match to the hydrophone. The technique described herein is well-suited to common geometries of bottom-referenced acquisition.

Some or all of the steps of the methods disclosed herein may be performed on any suitable computing system, such as a personal computer, a network server, or a supercomputer, as those skilled in the art will recognize. The steps of the methods described in connection with the present disclosure may be embodied directly in hardware, in a software module executed by a processor, or in a combination of the two. A software module may reside in any form of storage medium that is known in the art. Some examples of storage media that may be used include random access memory (RAM), read-only memory (ROM), flash memory, an EPROM (erasable ROM), an EEPROM (electrically erasable ROM), registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

An Exemplary Dual Sensor Data Processing Scheme

FIG. 1 illustrates a flow diagram 100 of example operations for processing dual sensor (e.g., hydrophone and vertical geophone) data that includes enhanced wavefield separation and removal of the coherent geophone noise. This method utilizes the fact that the hydrophone recording is unaffected by the V(z) noise. Any energy on the geophone that is inconsistent with energy on the hydrophone may be either undesirable (noise) or attenuated relative to the hydrophone (obliquity or coupling). The proposed method addresses both of these conditions. Note that this method is purely data driven and does not have any inherent limitation with respect to sub-surface complexity.

The operations begin, at step 102, by collecting hydrophone and geophone gathers of seismic data from a hydrophone and a vertical geophone. The gathers may be from deep water and/or shallow water and may be performed using any suitable source/receiver configuration, such as common receiver gathers. The geophone gathers may be phase adjusted for a wavelet match to the hydrophone data at step 104. At step 106, the three-dimensional (3-D) seismic data from the hydrophone and phase-adjusted geophone gathers may be windowed into a series of shot windows by dividing the two gathers into one or more windows in the time-offset (T-X) domain. As used herein, a window of seismic data generally refers to a subset (in position and/or time) of the seismic traces recorded during the gather. A window of the hydrophone gather may correspond to a window of the geophone gather, and the windows may overlap in both spatial dimensions x and y. However, with enough fidelity, the windows need not overlap.

FIG. 2 is an exemplary hydrophone gather 200 consisting of a "block" of ten traces 202, each from ten consecutive source lines, after windowing at step 106. These traces 202 represent all shots fired within a small rectangle on the surface and recorded at a common receiver sensor location.

Figure 2A:
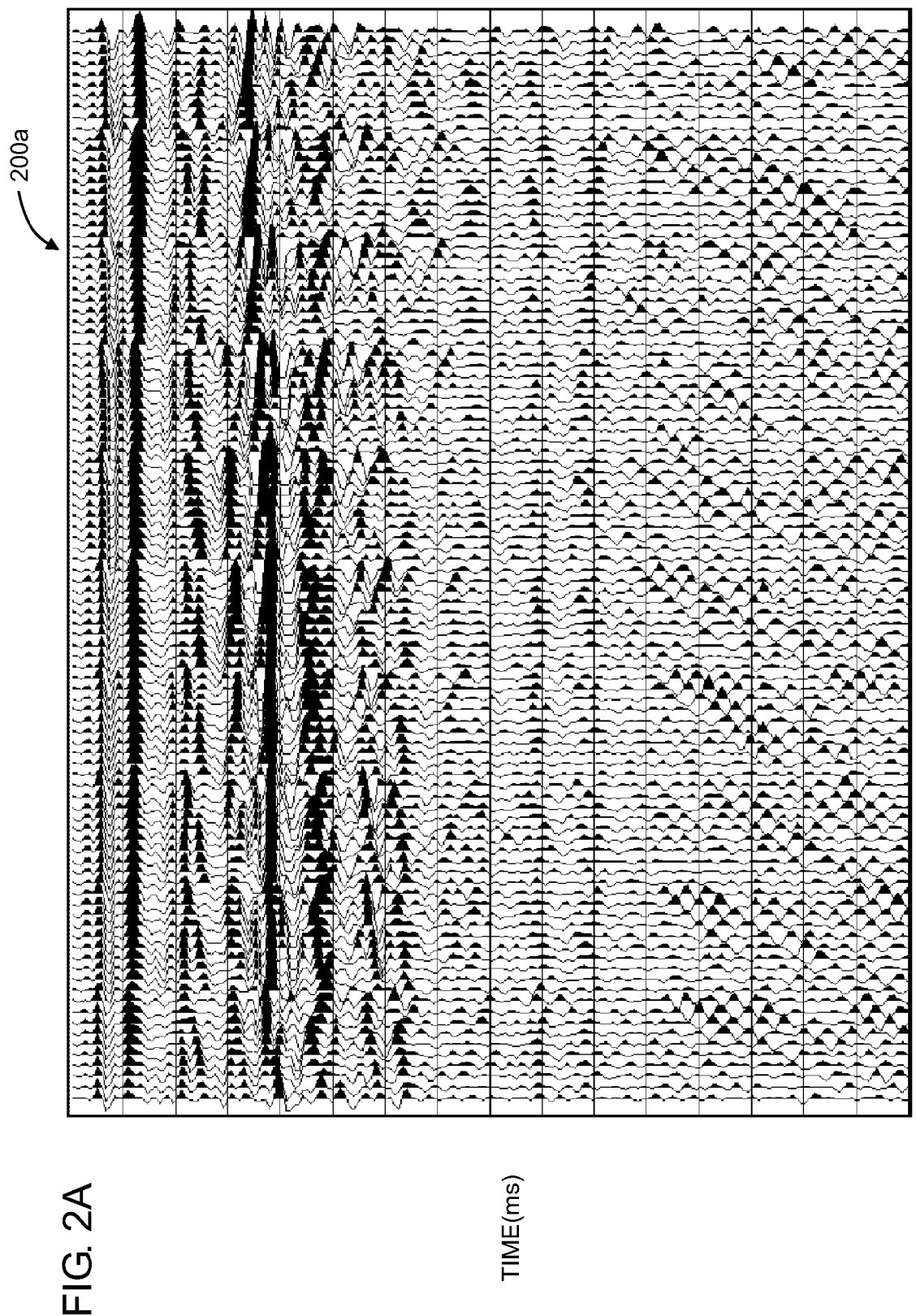
FIG. 2A illustrates the results of a forward and inverse tau-P (time-slowness) transform of the hydrophone data in FIG. 2, in accordance with an embodiment of the present invention.
Figure 3:
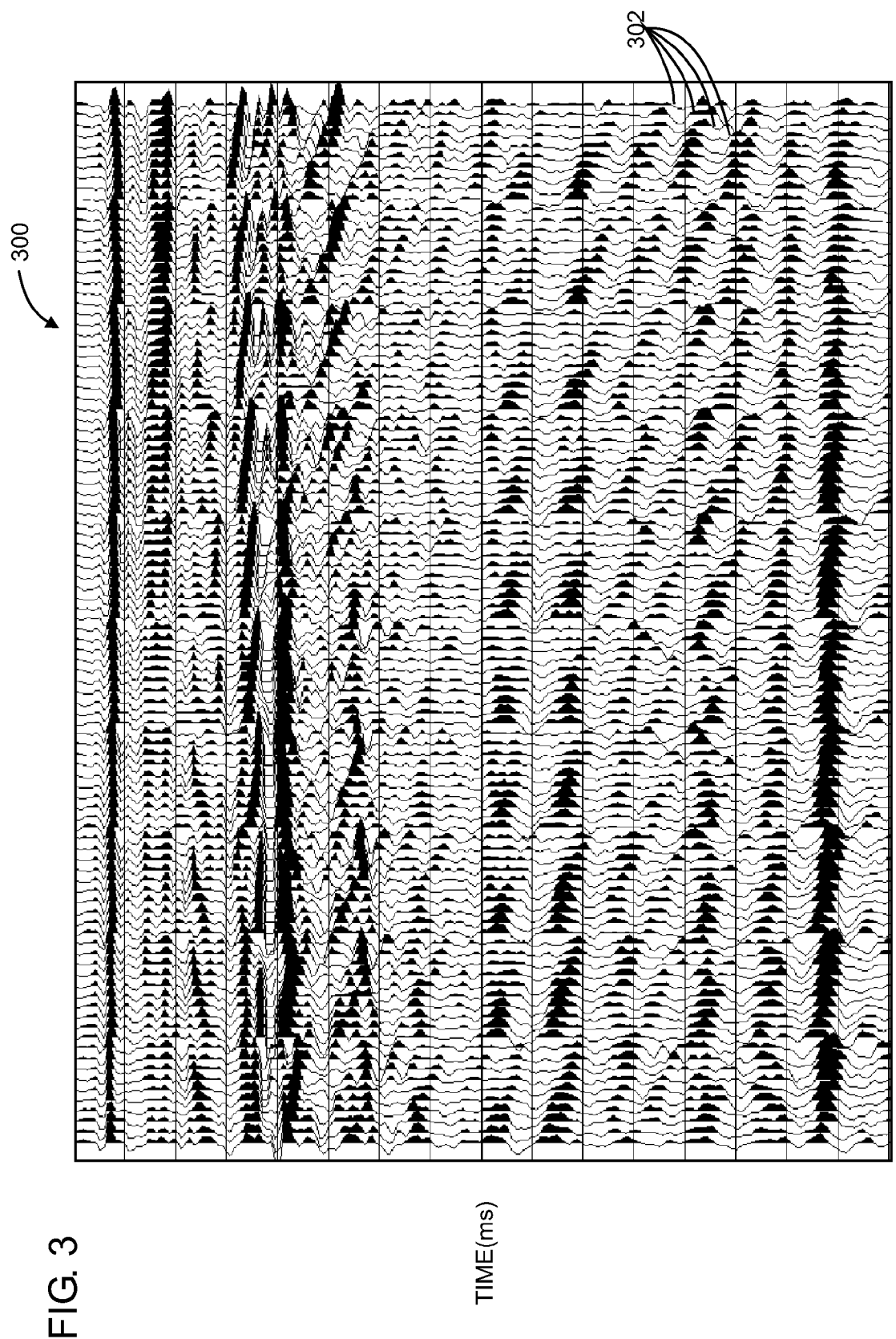
FIG. 3 is an exemplary vertical geophone gather for a common receiver configuration, in accordance with an embodiment of the present invention.

FIG. 3 is an exemplary vertical geophone gather 300 consisting of a "block" of ten traces 302 each from ten consecutive source lines, after windowing at step 106. These traces represent all shots fired within a small rectangle on the surface and recorded at a common receiver sensor location. The energy of the geophone gather 300 that matches the hydrophone gather 200 of FIG. 2 in time and amplitude is different in sign of amplitude. This indicates that said energy is downgoing energy. Additionally, most of the energy on the lower half of the geophone gather 300 is not matched on the hydrophone gather 200, indicating that it is geophone-coherent noise (V(z) noise).

Figure 5:
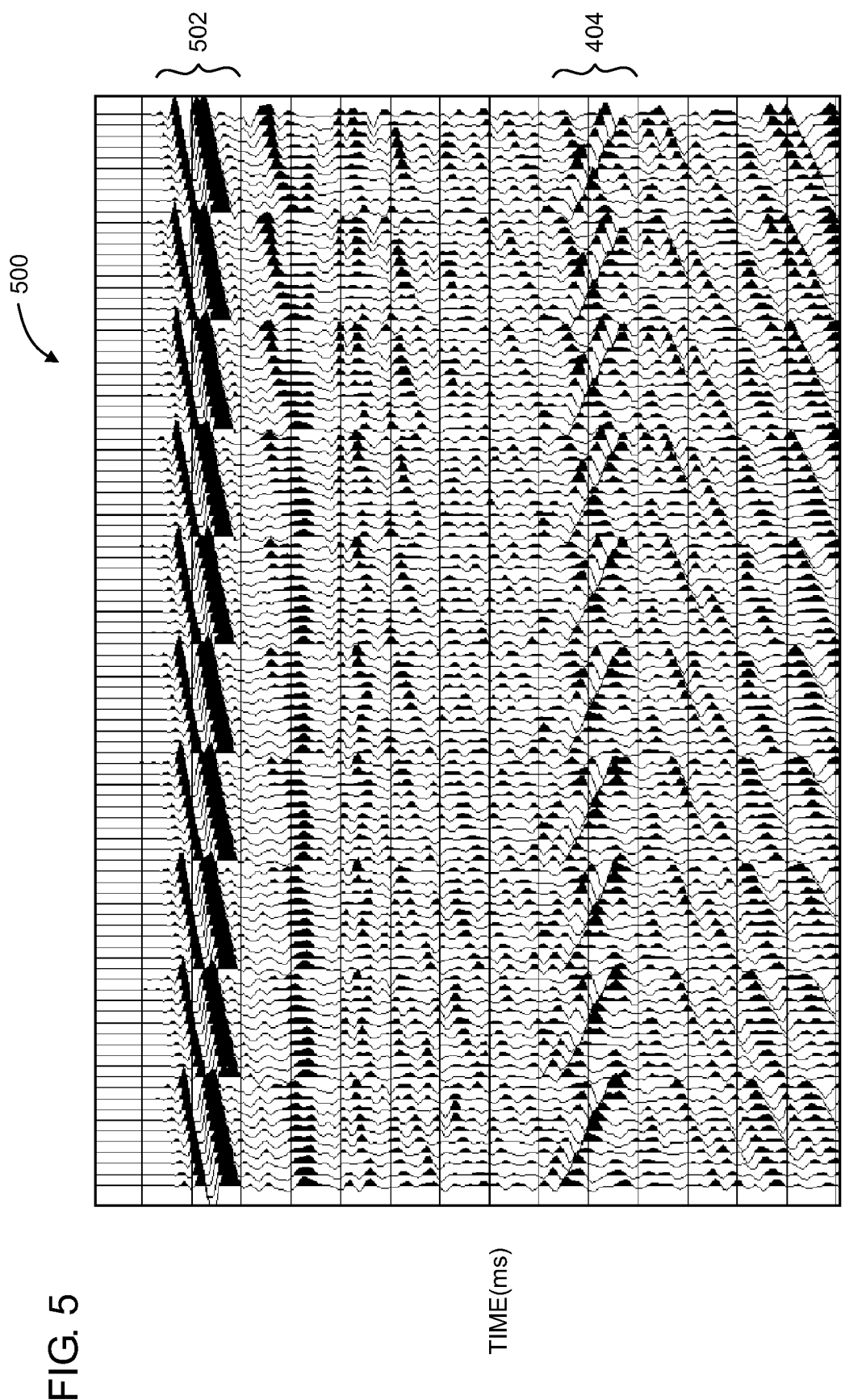
FIG. 5 illustrates an exemplary shallow window from a geophone which contains direct arrival at approximately 1200 ms and another signal that is all up-going, in accordance with an embodiment of the present invention.

FIG. 4 illustrates an exemplary shallow window 400 from a hydrophone, which contains a direct arrival 402 (downgoing) at approximately 1200 ms and another signal 404 that is all up-going. FIG. 5 illustrates an exemplary shallow window 500 from a geophone, which corresponds to the hydrophone shallow window 400 of FIG. 4. The geophone shallow window 500 contains a direct arrival 502 at approximately 1200 ms and another signal 504 that is all up-going. The geophone shallow window 500 has energy that is not present in the hydrophone shallow window 400 of FIG. 4.

Figure 6:
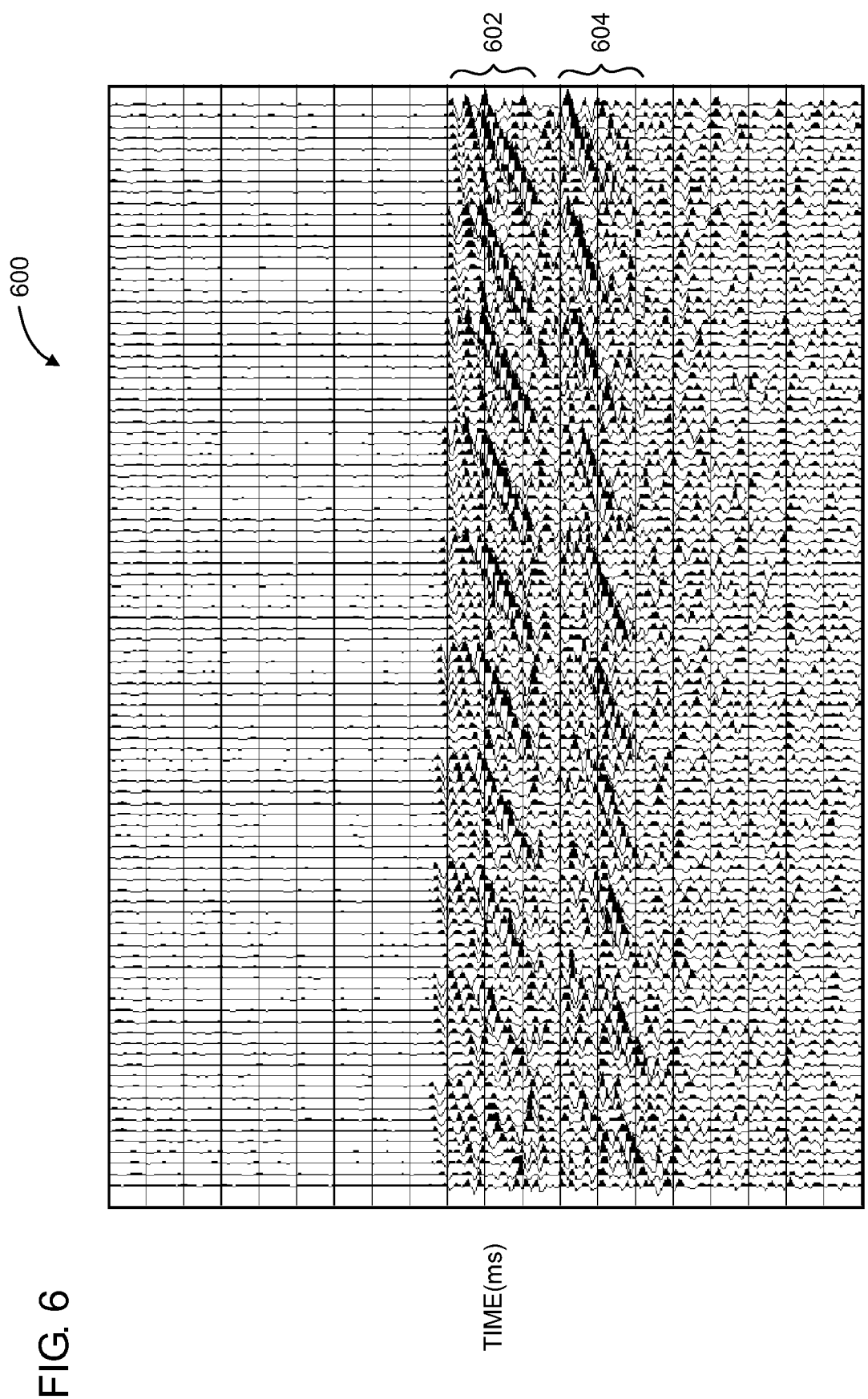
FIG. 6 illustrates an exemplary deeper window from a hydrophone containing multiple arrivals at approximately 3400 to 3600 ms and another signal that is mostly down-going, in accordance with an embodiment of the present invention.
Figure 7:
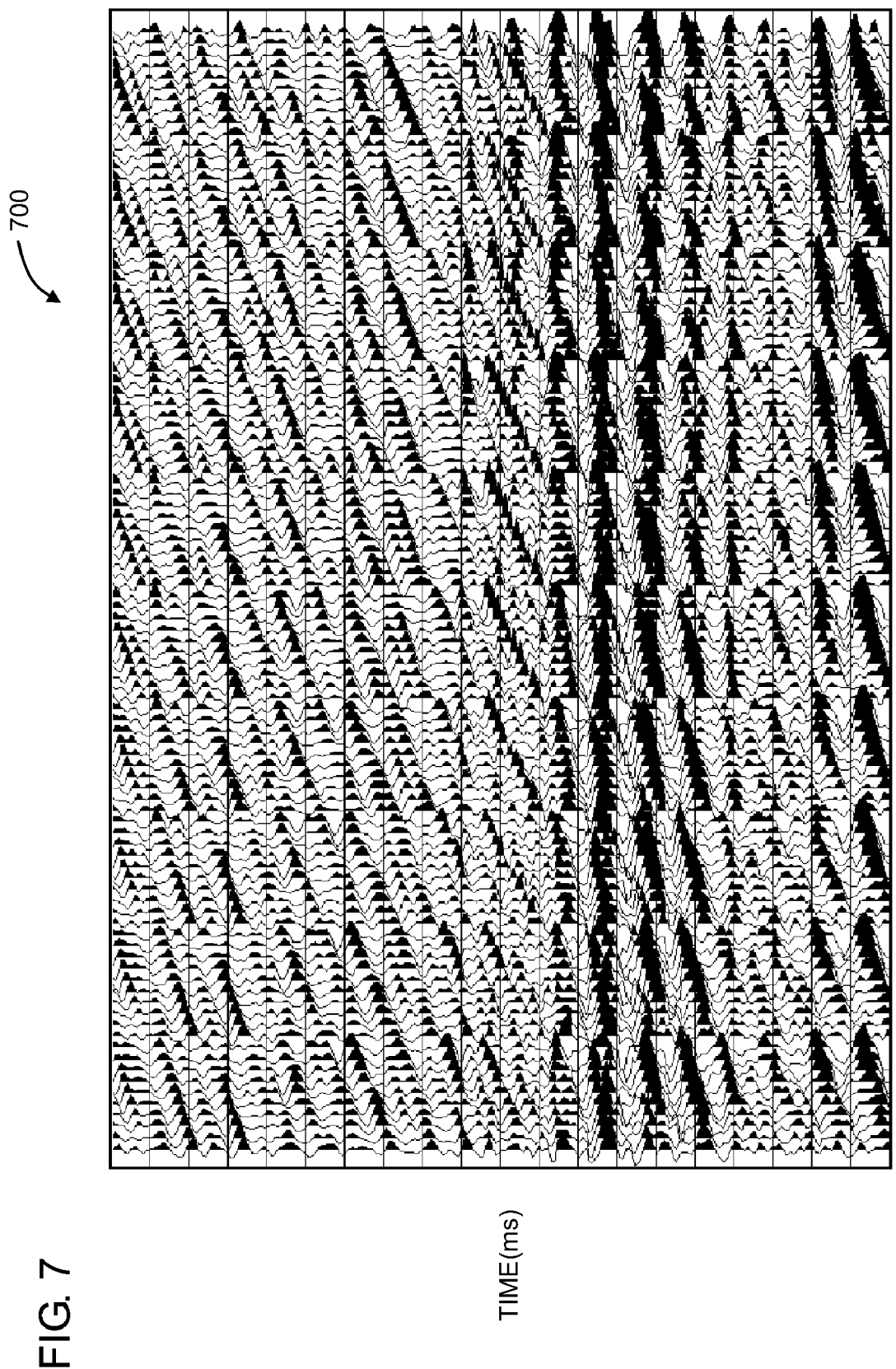
FIG. 7 illustrates an exemplary deeper window from a geophone showing a great deal of noise obscuring the signal content, in accordance with an embodiment of the present invention.

FIG. 6 illustrates an exemplary deeper window 600 from a hydrophone, containing multiple arrivals 602 at approximately 3400 to 3600 ms and another signal 604 that is mostly down-going. FIG. 7 illustrates an exemplary deeper window 700 from a geophone, which corresponds to the hydrophone deeper window 600 of FIG. 6. The geophone deeper window 700 contains a great deal of noise that obscures the signal content.

Referring again to FIG. 1, a series of operations may be performed at step 107 for each of pair of corresponding hydrophone and geophone windows. These operations begin, at step 108, by performing a three-dimensional (3-D) tau-P transform separately for the hydrophone and geophone windows of the pair in an effort to transform the seismic data into the time-slowness (tau-P) domain. As described above, the 3-D tau-P transformation may rely on Radon transformation equations to transform data from the T-X domain to the 3-D tau-P domain. More specifically, the T,X,Y data is transformed along kinematic travel time trajectories having constant velocities and slownesses, where slowness p is defined as the reciprocal of velocity (p=1/v).

The 3-D tau-P transform may consist of a series of dip or slant stacks for a series of inline and crossline components of dip over all the traces in a T,X,Y block, such as the 10×10 traces block shown in FIG. 2. All coherent energy in the block contained within the range of dips that are scanned may be represented in the "Tau," "$P_x$," "$P_y$," space, where "Tau" represents the time at the target or reference X,Y location for the transform, usually the center of the analysis gather, and "$P_x$" and "$P_y$" represent inline and crossline dip, respectively, in units of milliseconds (ms) per reference offset.

Figure 8:
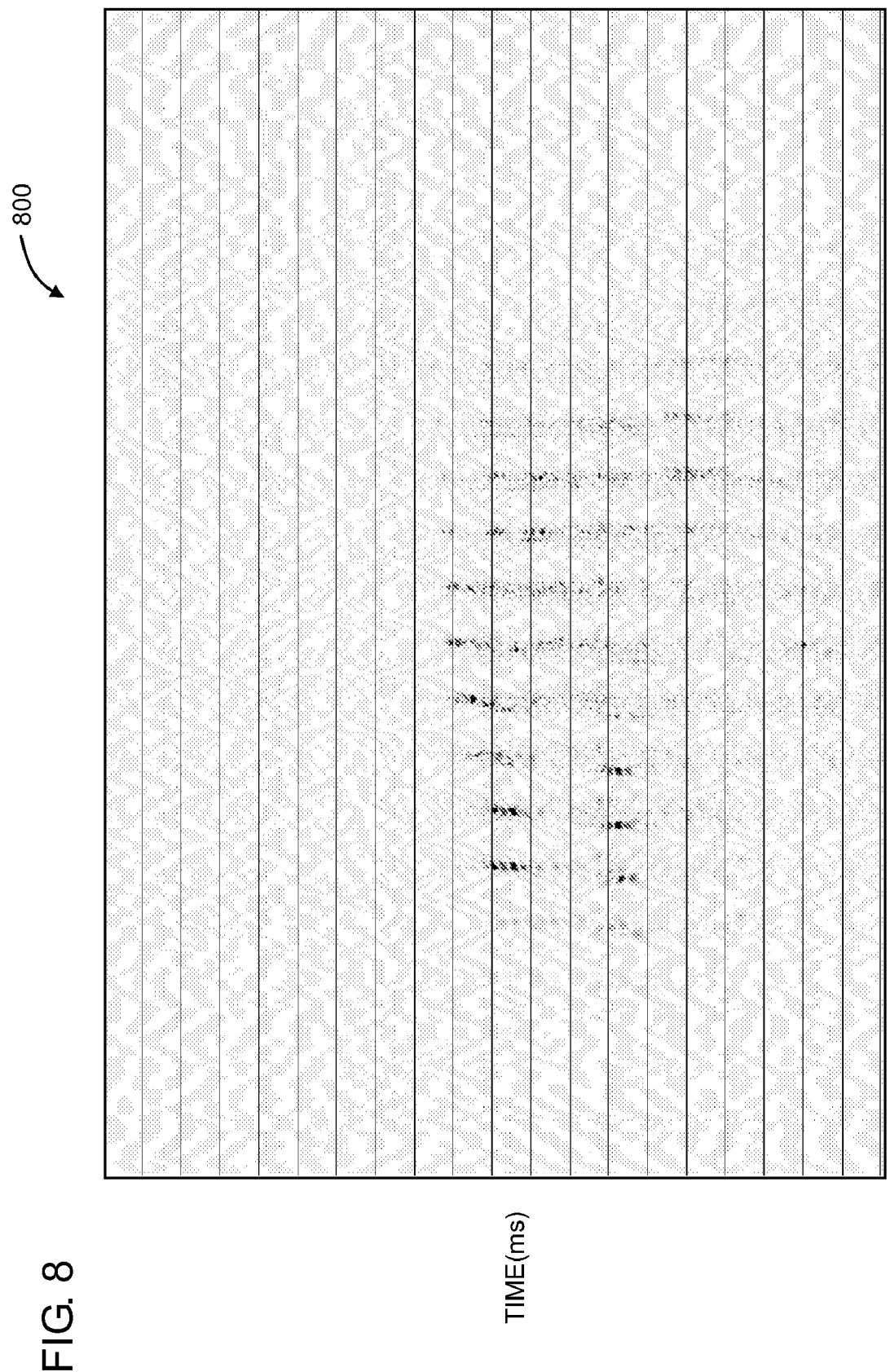
FIG. 8 illustrates the tau-P space of the hydrophone gather of FIG. 6 after performing the 3-D tau-P transform, in accordance with an embodiment of the present invention.

FIG. 8 illustrates the tau-P space 800 of the hydrophone gather after performing the 3-D tau-P transform at step 108. In FIG. 8, there are 21 different crossline dip components for each of 21 inline dip components. For some embodiments, the inline "moveout" or dip and crossline "moveout" or dip may appear as different colors or shades of gray in the header plot. Discrete planar dipping events in TXY (time-offset) appear as local points in 3-D tau-P space.

Figure 9:
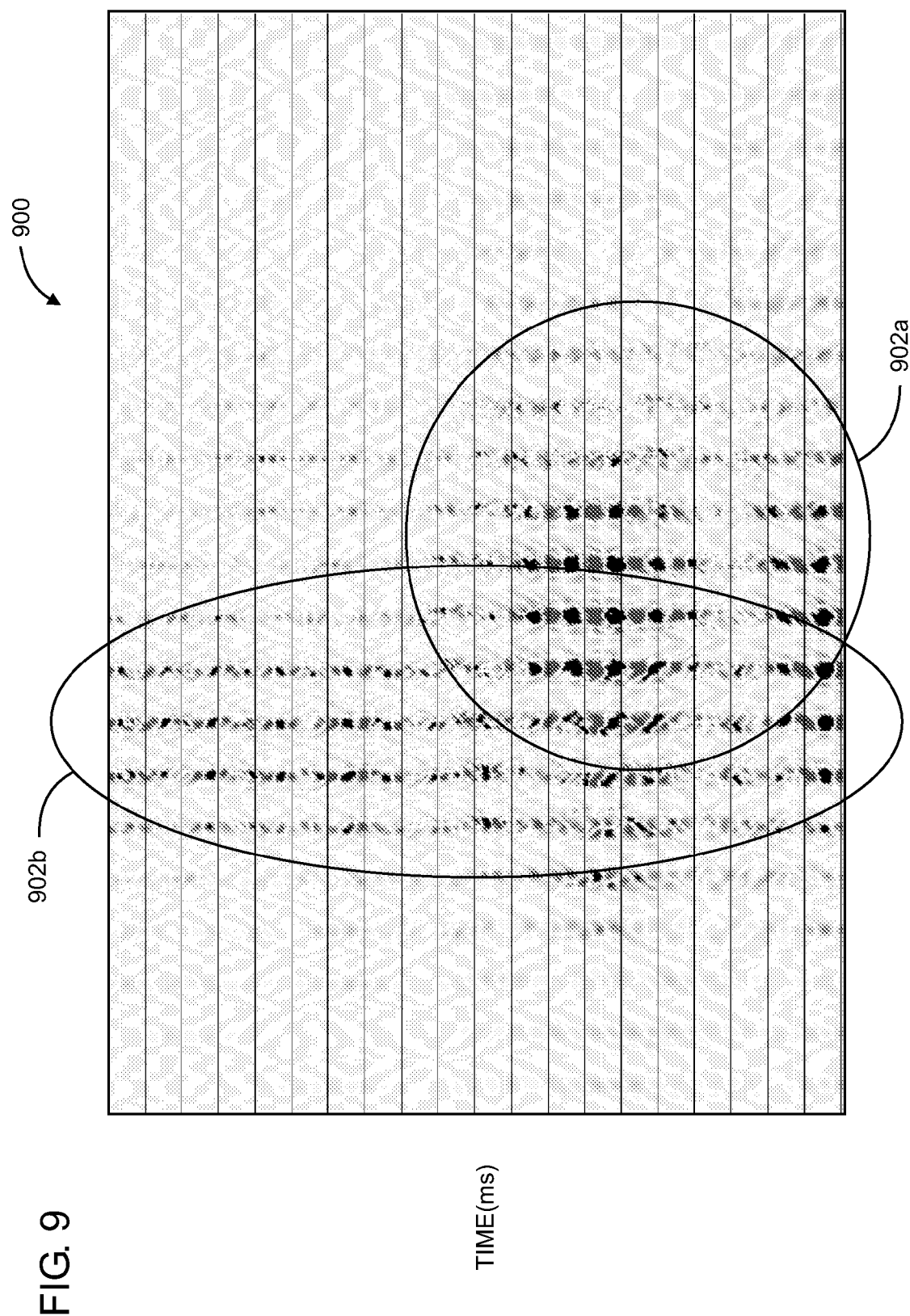
FIG. 9 illustrates the tau-P space of the geophone gather of FIG. 7, which reveals areas of high energy where none exist in the hydrophone tau-P space of FIG. 8, in accordance with an embodiment of the present invention.

FIG. 9 illustrates the tau-P space 900 of the deeper window 700 of FIG. 7 from a geophone gather, the tau-P space 900 revealing areas 902a, 902b of high energy where none exist in the hydrophone tau-P space 800 of FIG. 8. All energy in the hydrophone tau-P space 800 is matched in the geophone tau-P space 900.

The inverse 3-D tau-P transform may be of exactly the same computational nature as the forward 3-D tau-P transform, with the exception that the slant stack shifts are reversed. The quality of the round trip (forward and inverse) transform may be dependent on the spatial sampling of the T,X,Y data, the number of P samples used in $P_x$ and $P_y$, the application of frequency dependent correction filters called RHO filters, and management of sample aliasing of dip for higher frequencies. These concepts may be well-known to those skilled in the art of geophysical data processing.

Figure 3A:
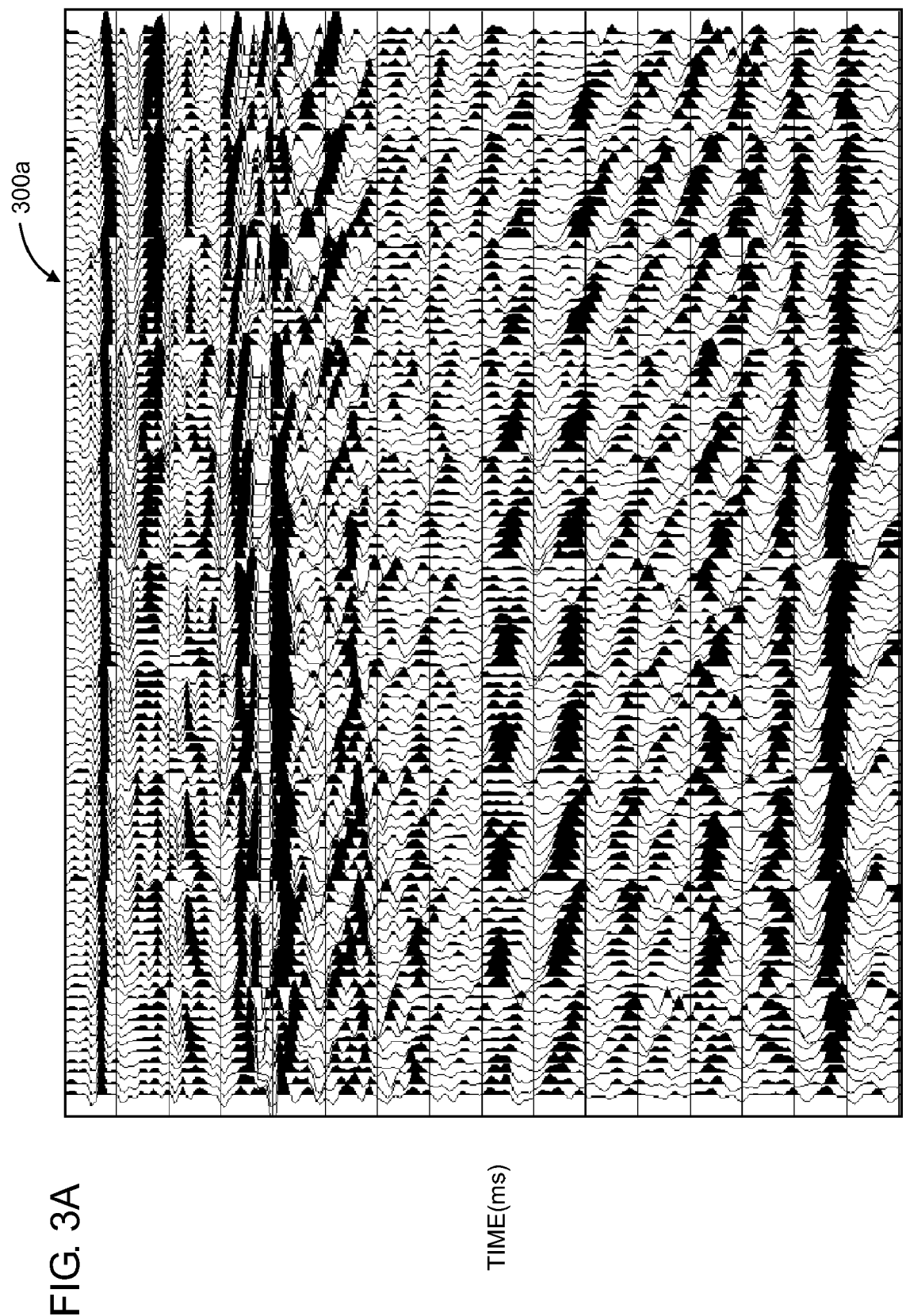
FIG. 3A illustrates the results of a forward and inverse tau-P transform of the geophone data in FIG. 3, in accordance with an embodiment of the present invention.

To substantiate the forward tau-P transform (as well as the inverse tau-P transform) implementation, FIG. 2A illustrates the results of a forward and inverse tau-P transform of the hydrophone gather 200 in FIG. 2 to produce a processed hydrophone gather 200a. To generate the hydrophone gather 200a of FIG. 2A, a very crude prototype tau-P transform was used for illustration of concept only. While not perfect, the crude tau-P transform produces an adequate representation of the original hydrophone gather 200. Likewise, FIG. 3A illustrates the results of a forward and inverse tau-P transform of the geophone gather 300 in FIG. 3 to produce a processed geophone gather 300a. Although there are artifacts in the processed geophone gather 300a, the crude tau-P transform produces an adequate representation of the original geophone gather 300, thereby providing evidence that the forward and inverse tau-P transform are implemented correctly.

At step 110, the tau-P data may be separated into a number of different frequency bands ($N_{fb}$), creating a four-dimensional (4-D) decomposition (Tau, $P_x$, $P_y$, Fband) of each sensor recording. The quality of the operations 100 of FIG. 1, including the degree of wavefield separation and the amount of noise removal, may be directly related to the number and distribution of these different frequency bands. For some embodiments, 10, 15, or 20 frequency bands may conceivably be employed. Typically, adjacent frequency bands may overlap somewhat in frequency, and for some embodiments, the frequency bands may have different bandwidths. However, the bandwidths should not be too narrow because temporal locality may then be lost. A bandwidth around an octave may be a good choice. This frequency decomposition along with the 3-D tau-P transform at step 108 composes the "TXY to TauPPF transform."

The frequency decomposition at step 110 may be accomplished by any suitable means. For example, band separation may be accomplished by applying a series of band pass filters either in the time domain or frequency domain to each time trace, retaining a portion of its spectrum. These filters may be of any suitable form as long as they are zero phase and the effective sum of these filters in the time domain is a unit spike. One such option is a series of Ormsby band pass filters with corrections to make the sum completely white (i.e., a time domain spike).

Another suitable method of frequency decomposition may consist of a local 3-D dip decomposition (T,X,Y to Tau,$P_x$,$P_y$), further leveraged into a fourth dimension through a time preserving frequency decomposition (see Mallat, S., and Z. Zhang, "Matching pursuit with time-frequency dictionaries," *IEEE Transactions in Signal Processing*, Technical Report 619, 1992, herein incorporated by reference). A Morlet wavelet based CWT (continuous wavelet transform) may be used, but again, virtually any series of overlapping band filters summing to a white zero phase spectrum may most likely work (see Morlet, J., G. Arens, E. Fourgeau, and D. Giard, "Wave propagation and sampling theory—Part II: Sampling theory and complex waves," *Geophysics*, 47, pp. 222-236, 1982, herein incorporated by reference). Best results were found using Morlet wavelets sampled linearly in logarithm of frequency.

Figure 10B:
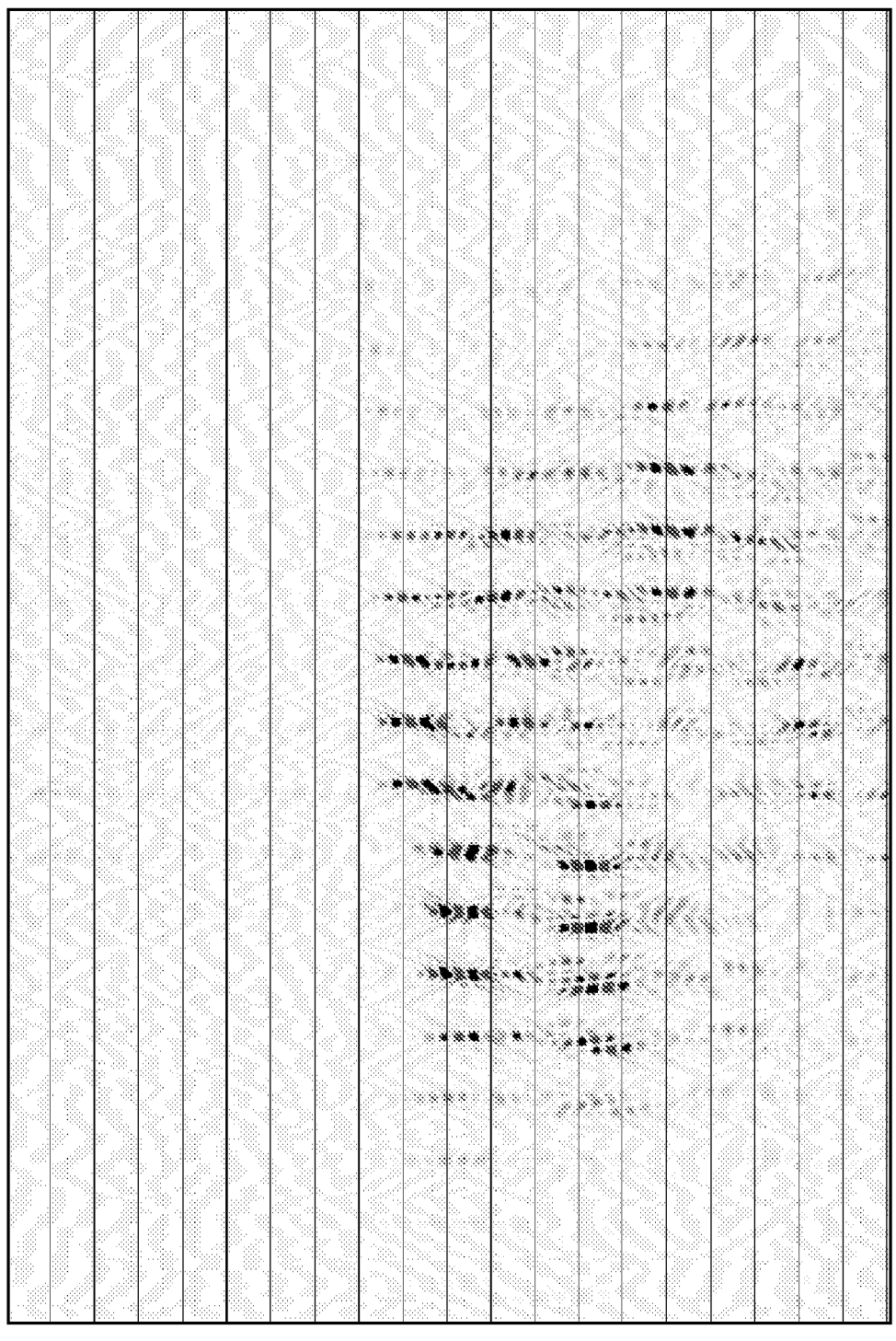
Figure 10C:
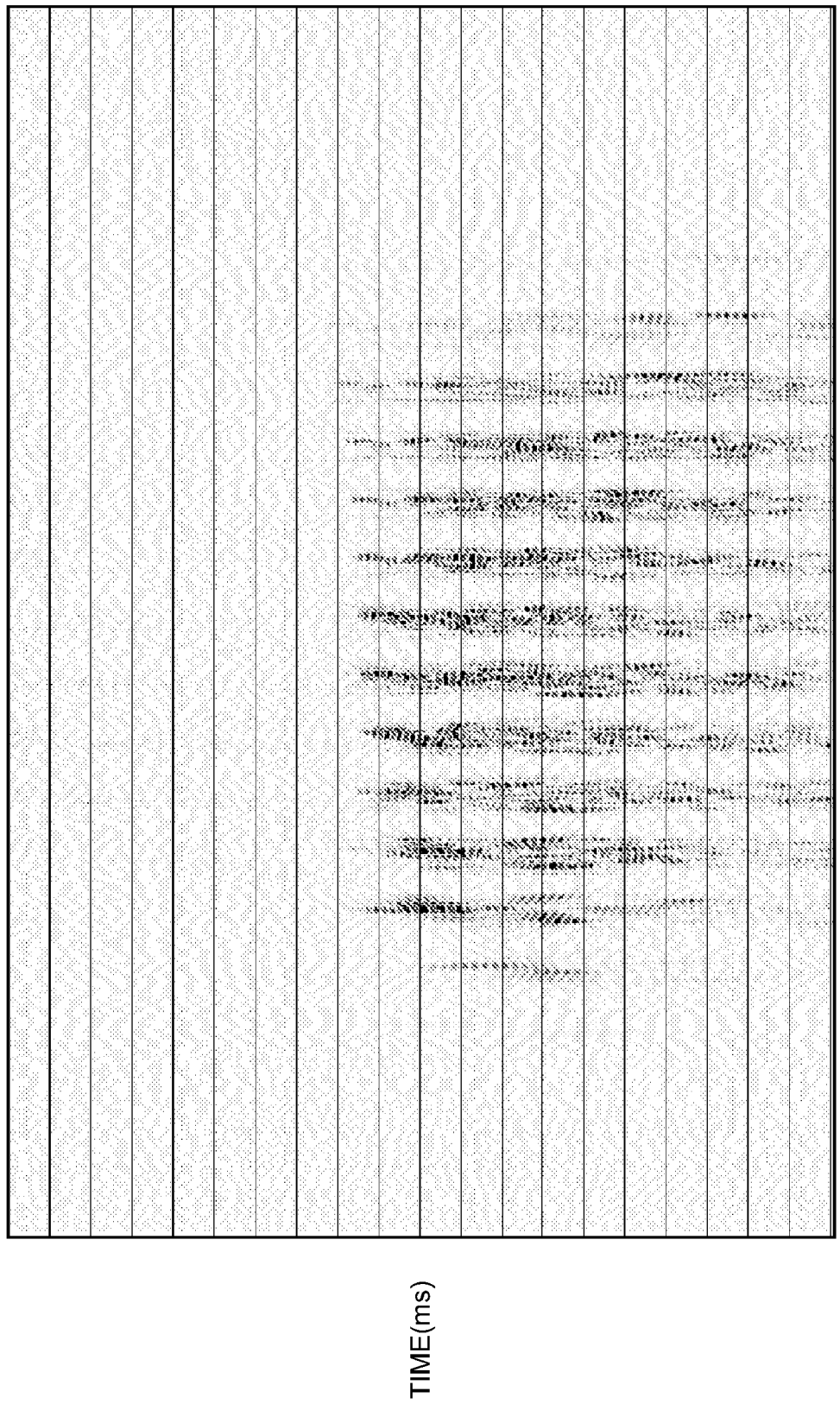
Figure 10D:
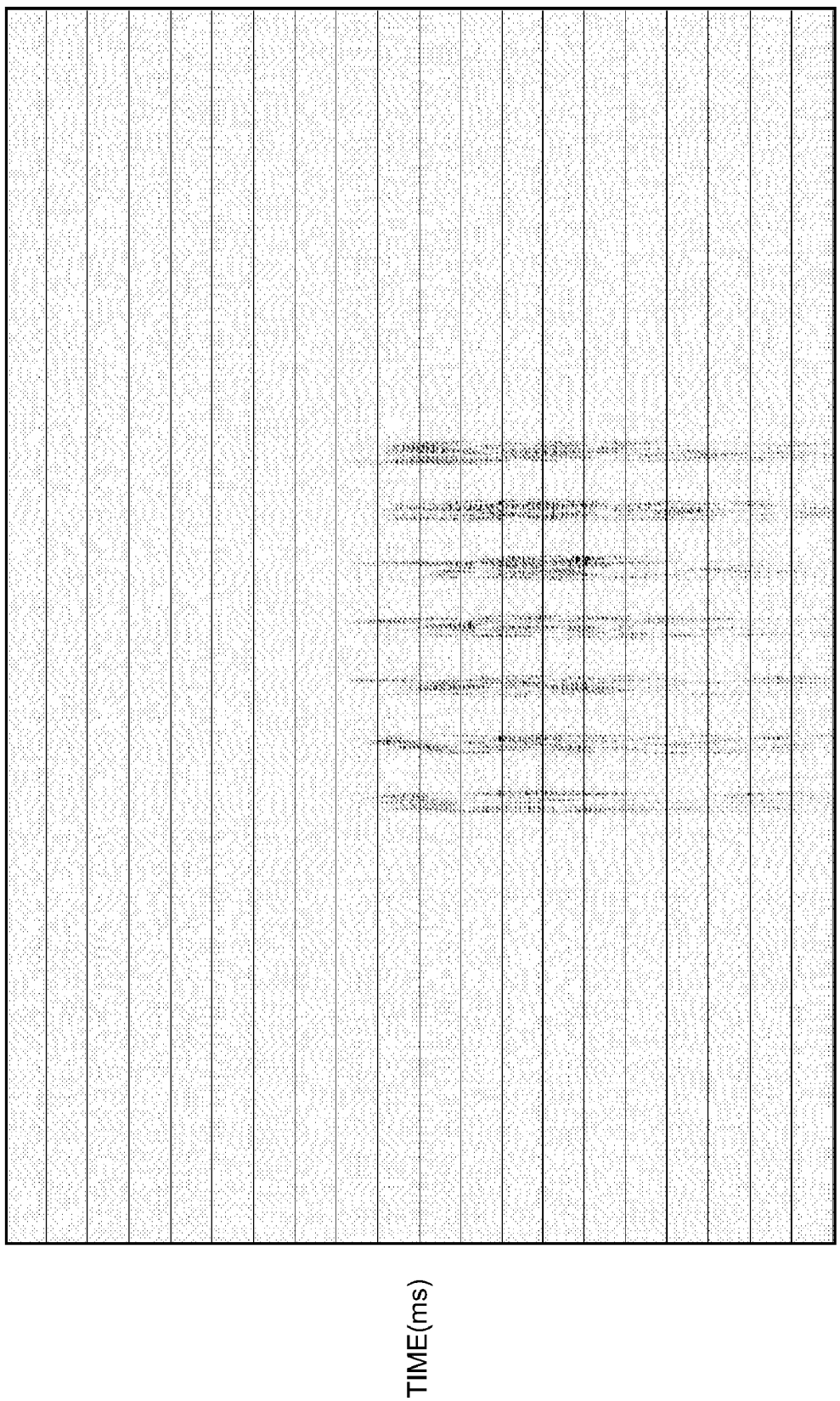
Figure 11A:
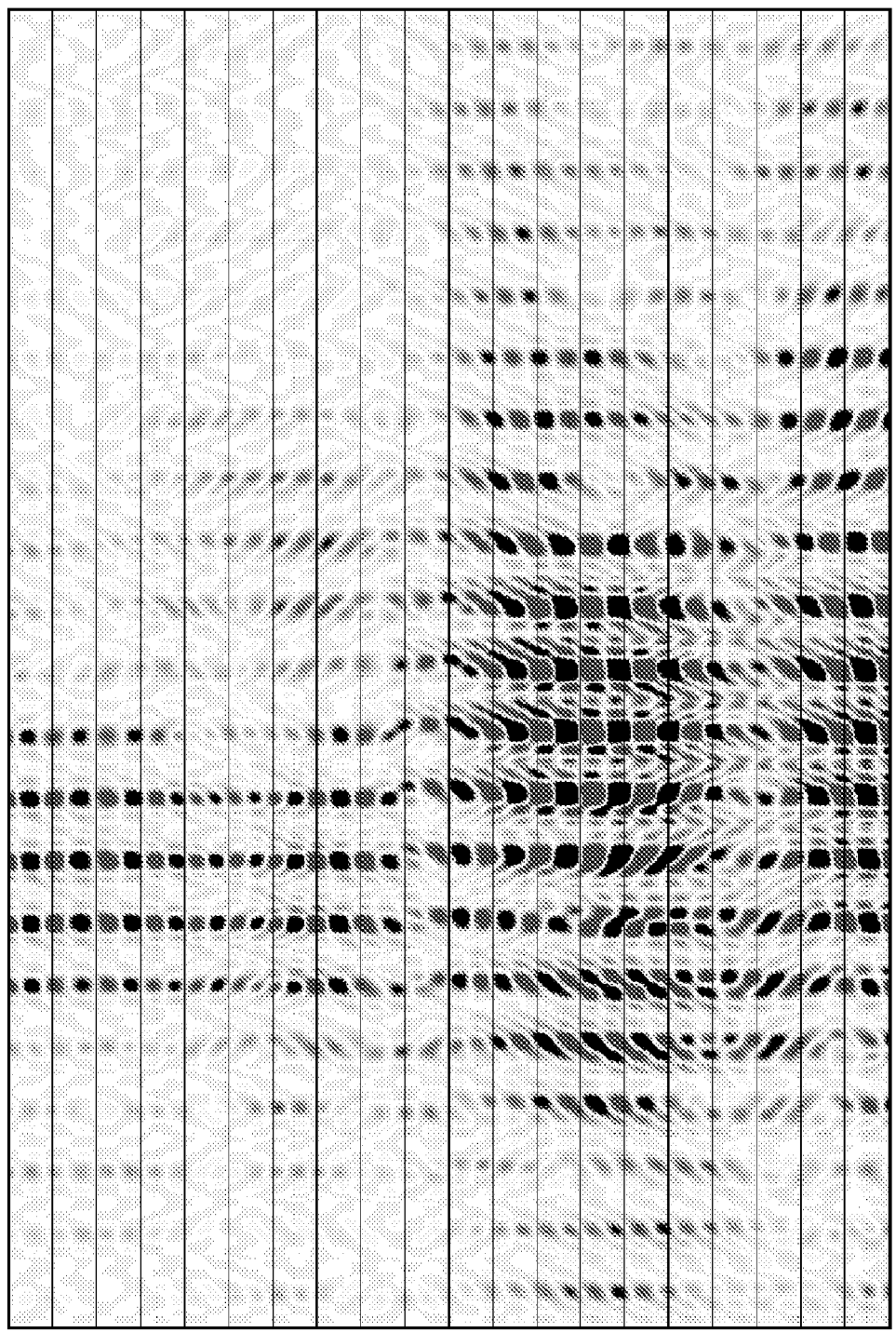
FIGS. 11A-D illustrate frequency bands 1 through 4 after dividing the geophone tau-P space of FIG. 9 into four frequency bands, in accordance with embodiments of the present invention.
Figure 11B:
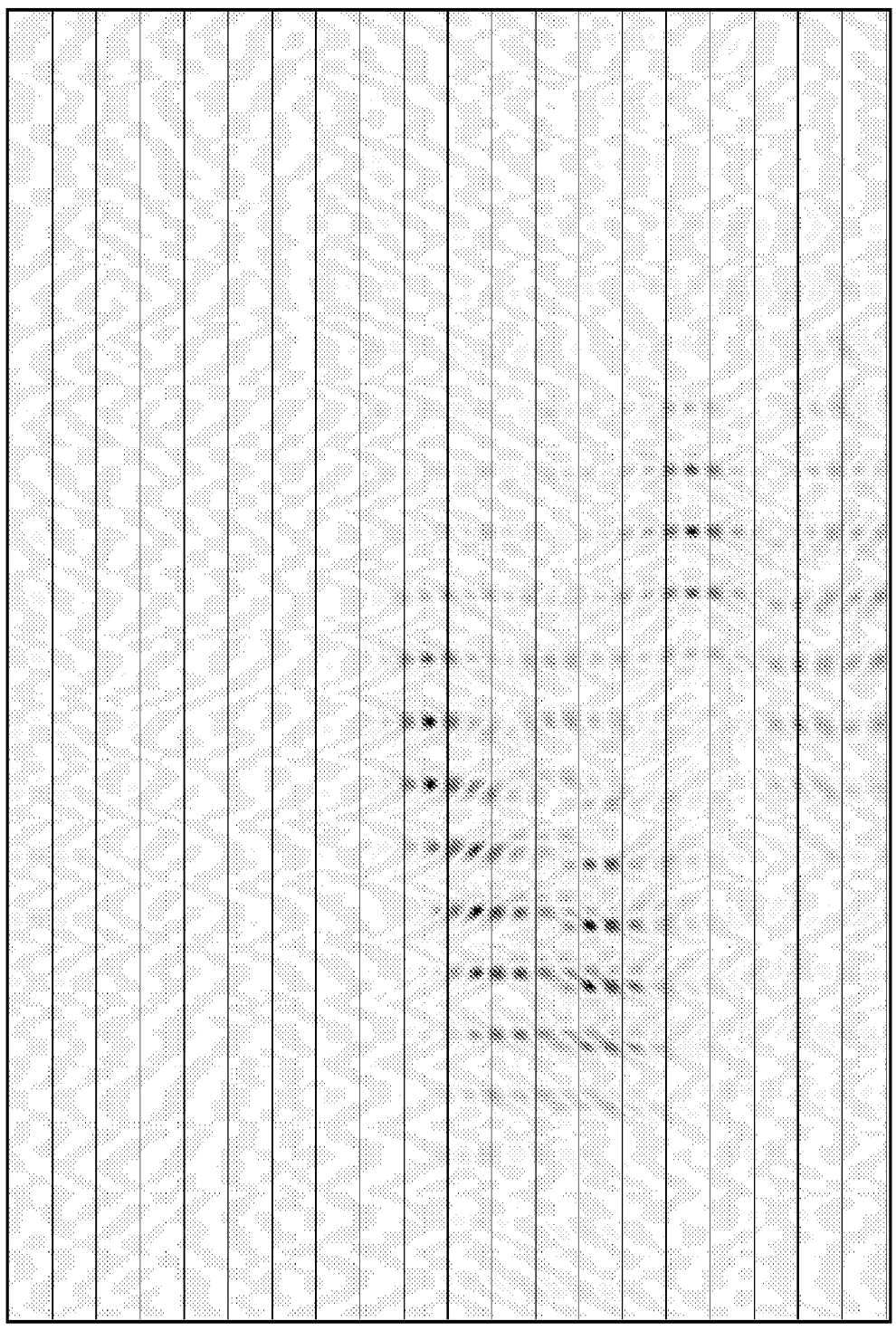
Figure 11C:
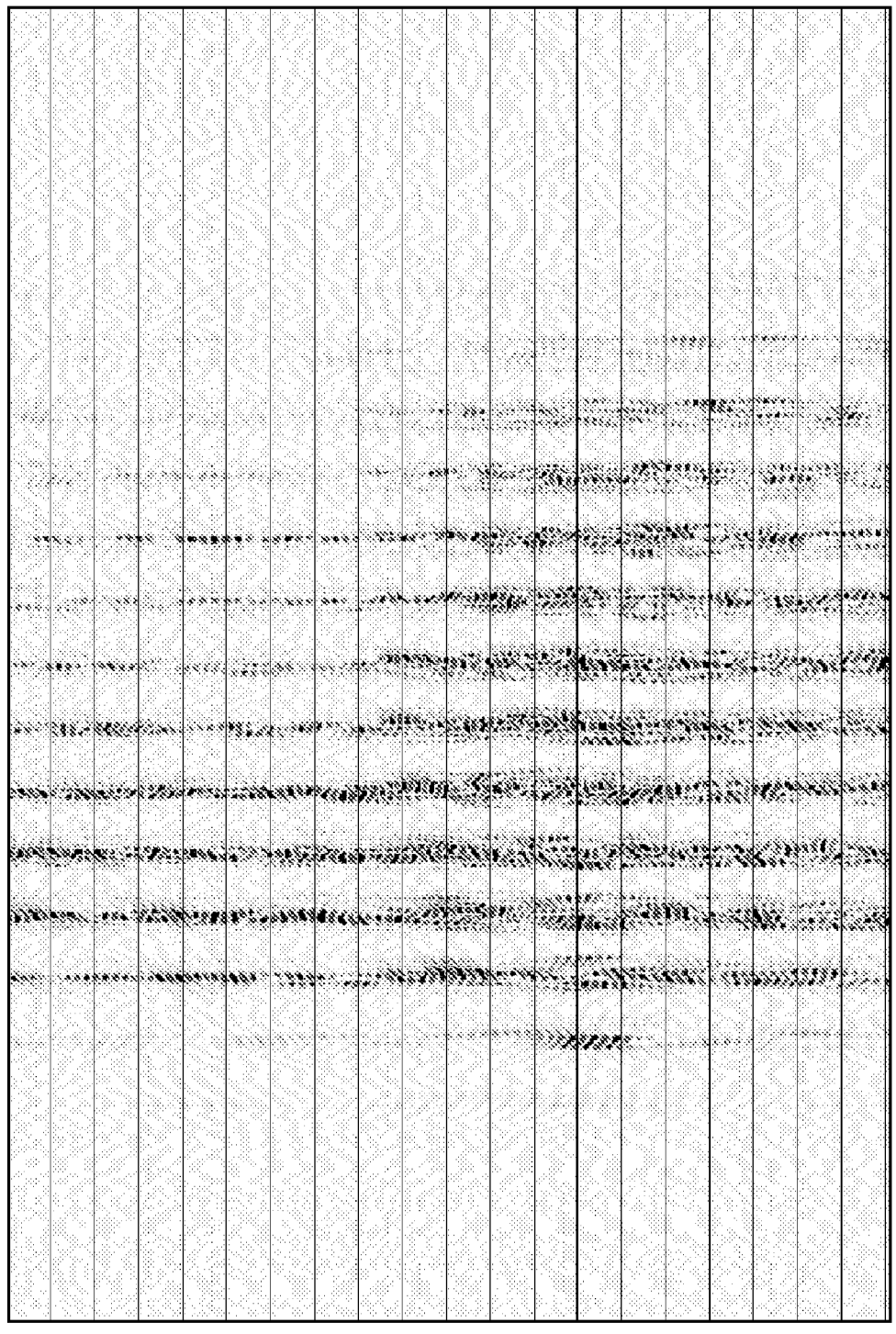
Figure 11D:
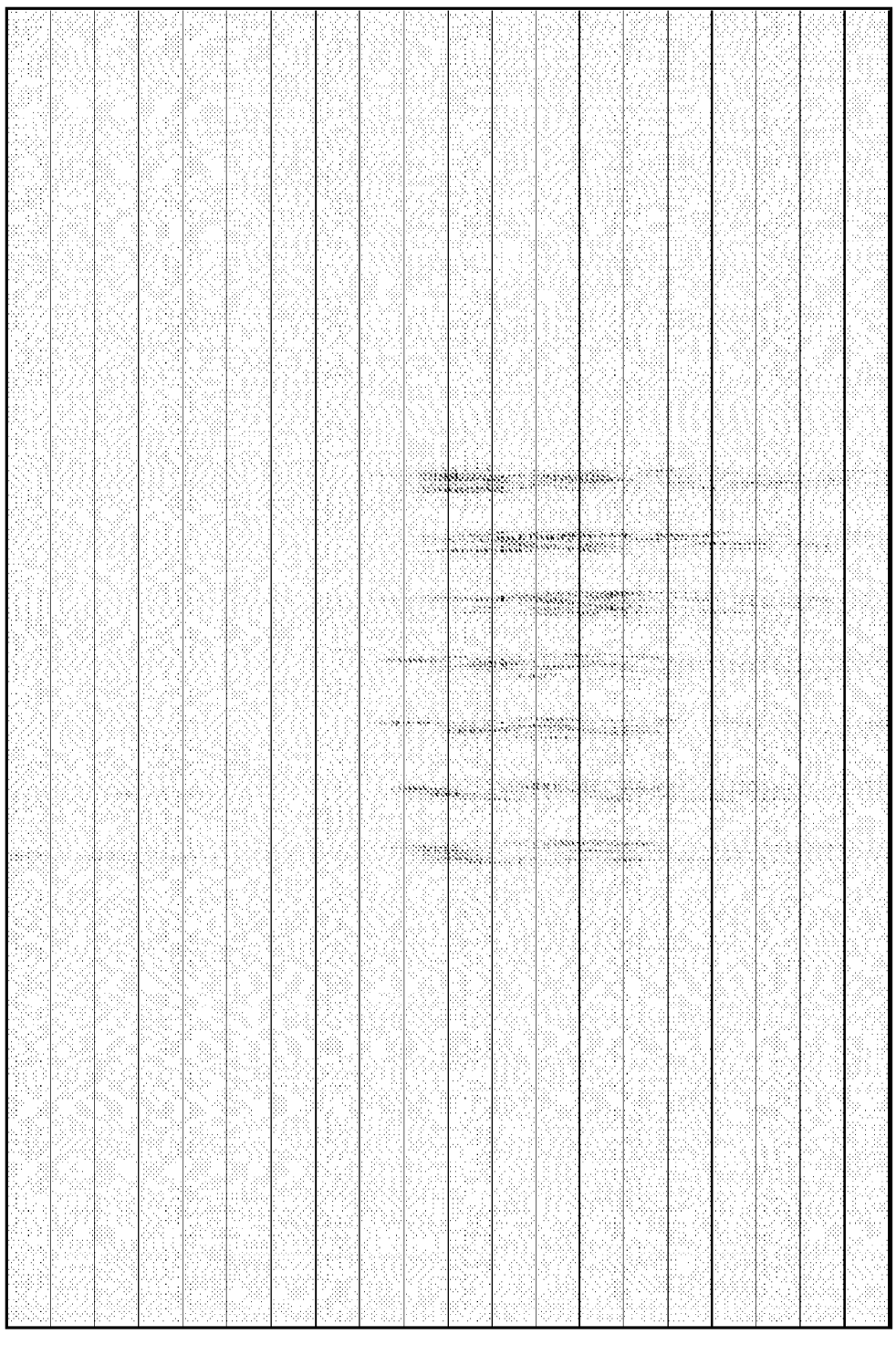
Figure 12A:
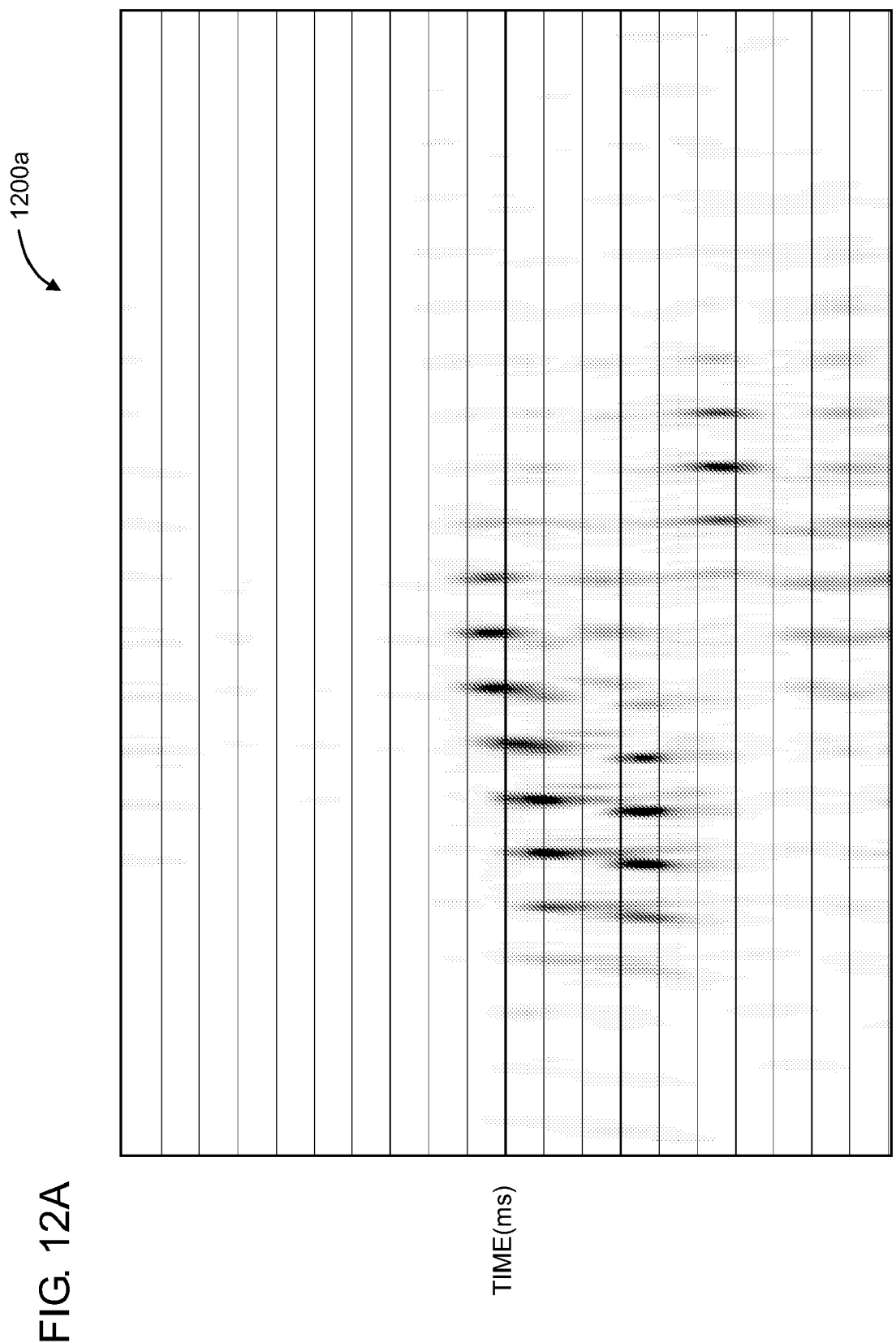
FIGS. 12A-D portray envelopes of the frequency bands of FIGS. 10A-D, respectively, for the hydrophone, in accordance with embodiments of the present invention.
Figure 12B:
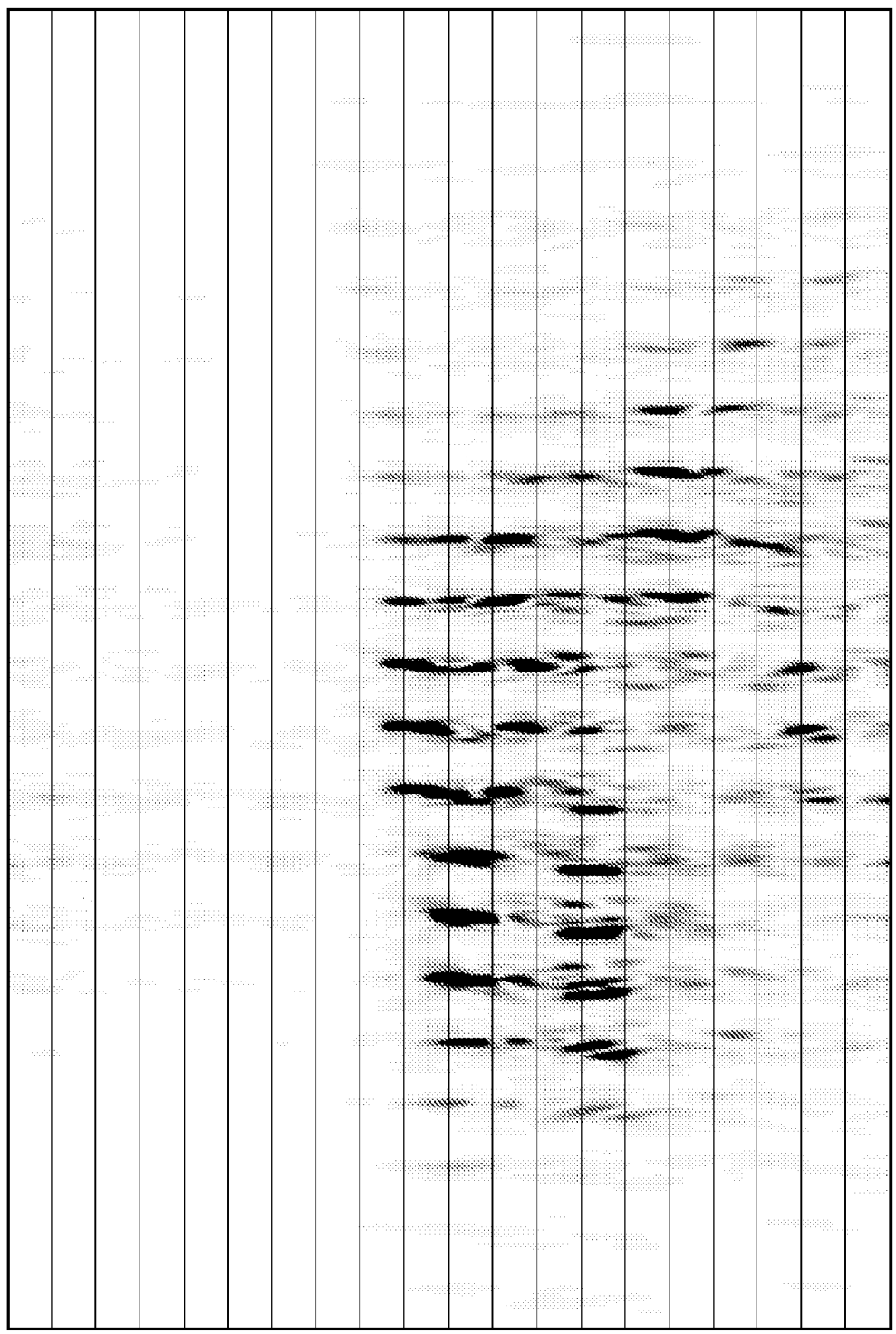
Figure 12C:
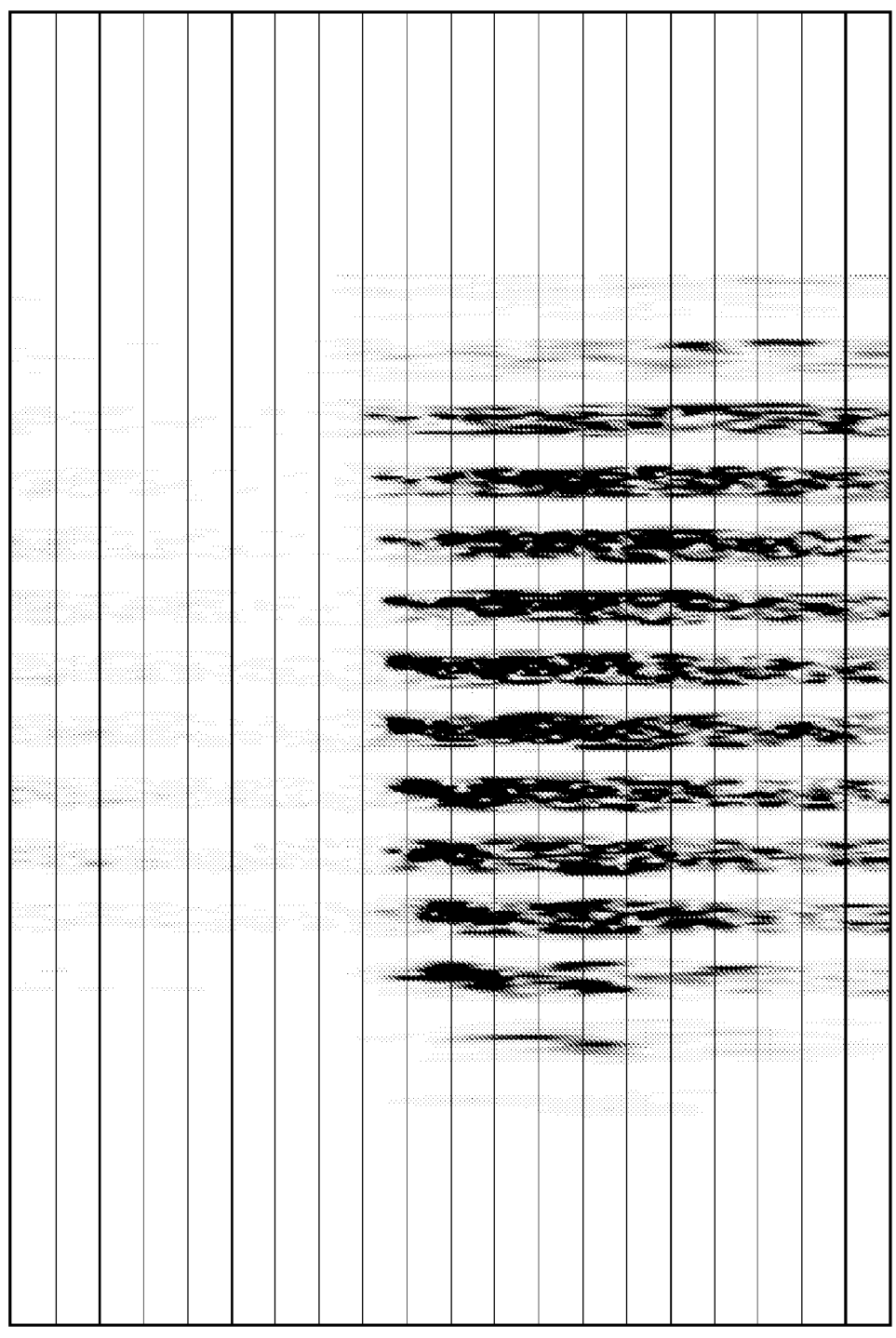
Figure 12D:
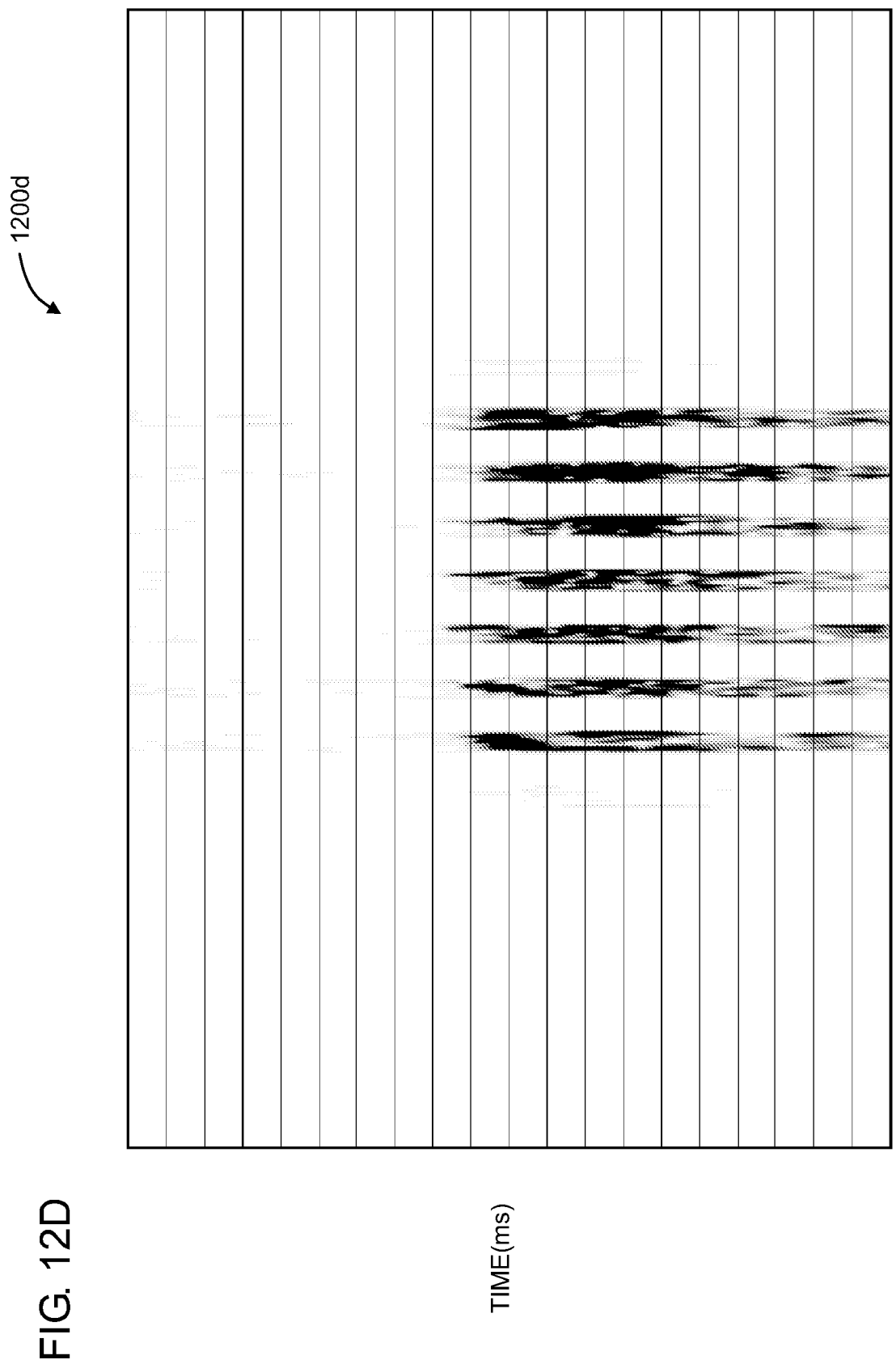
Figure 13A:
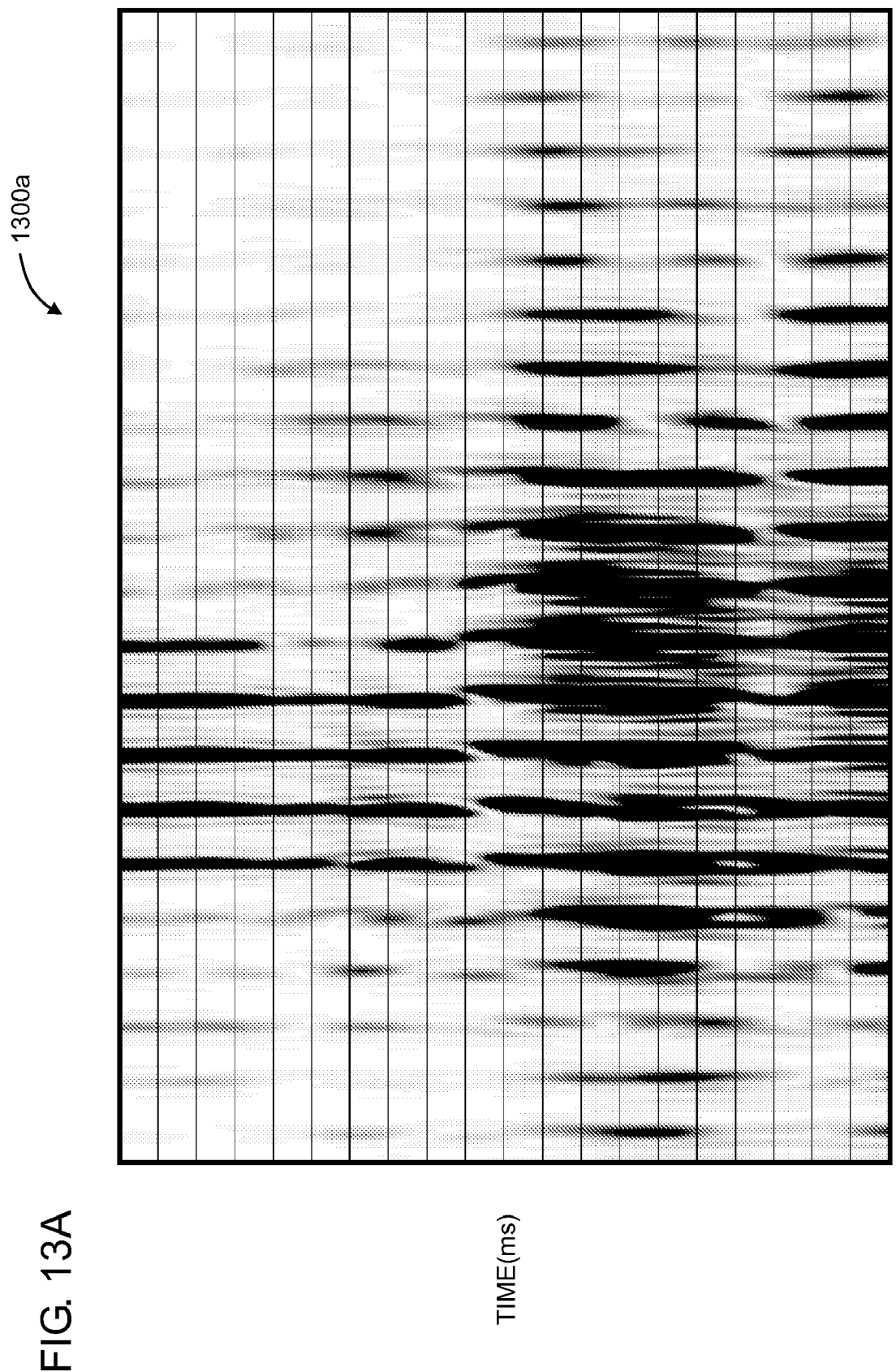
FIGS. 13A-D portray envelopes of the frequency bands of FIGS. 11A-D, respectively, for the geophone, in accordance with embodiments of the present invention.
Figure 13B:
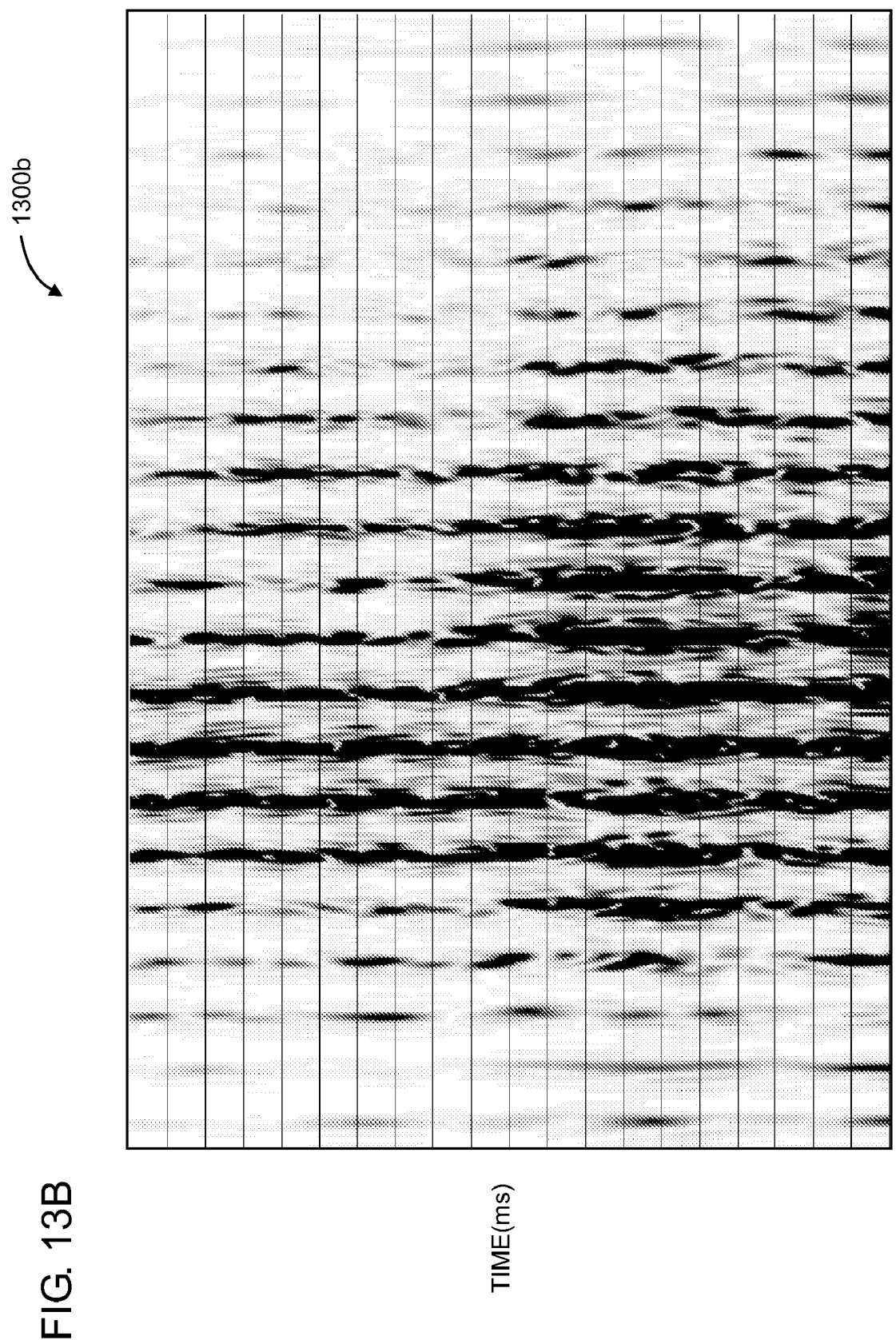
Figure 13C:
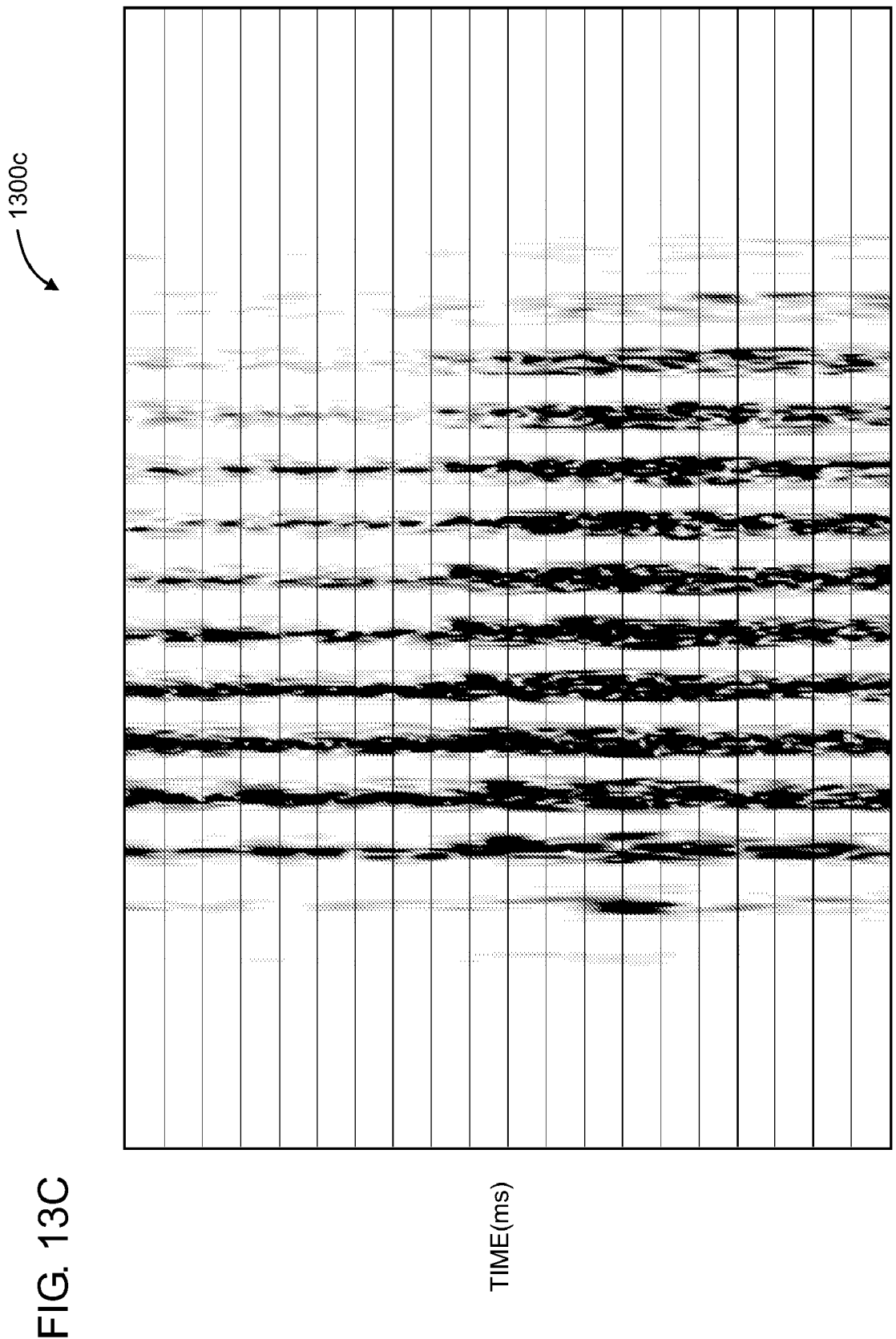
Figure 13D:
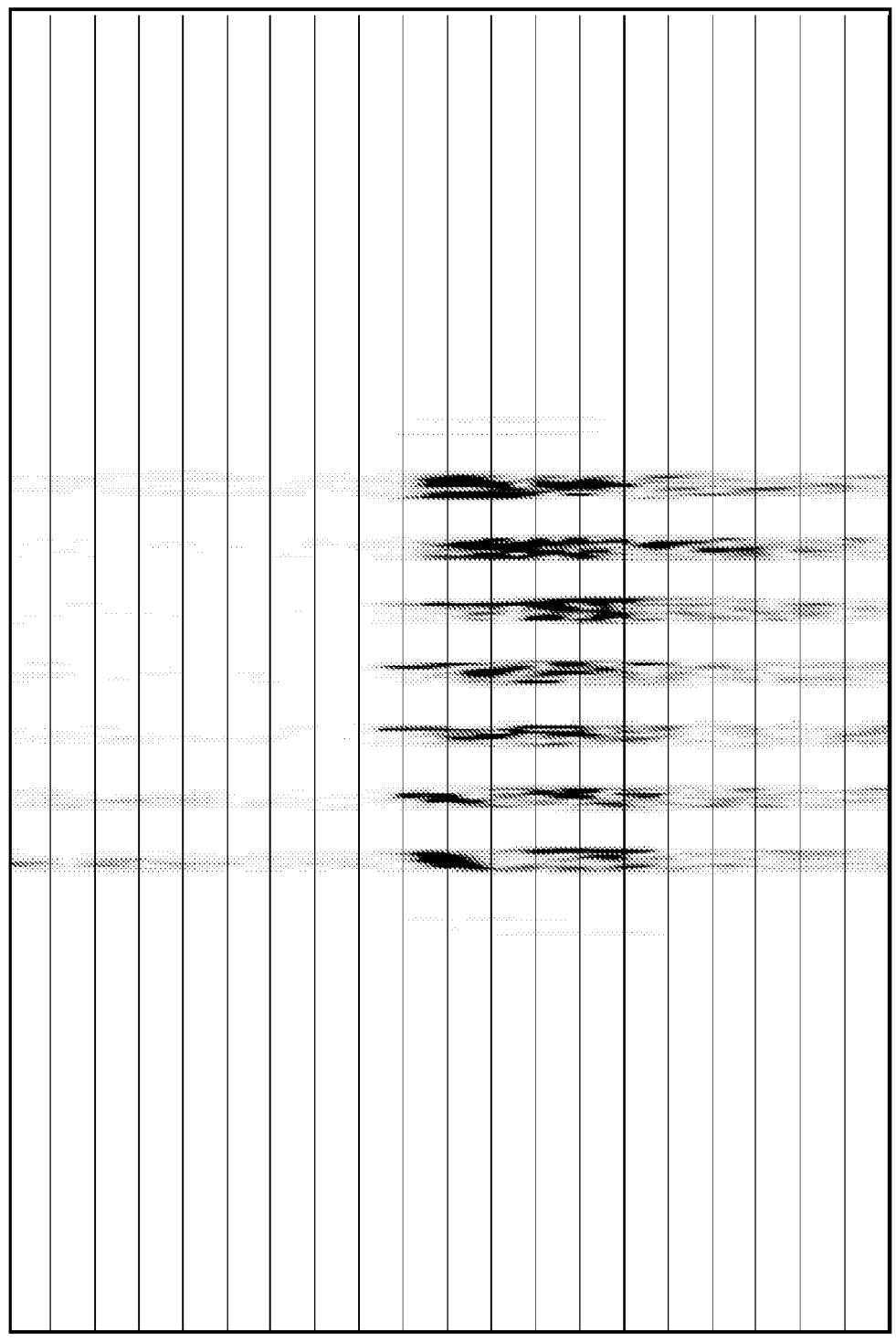
Figure 14A:
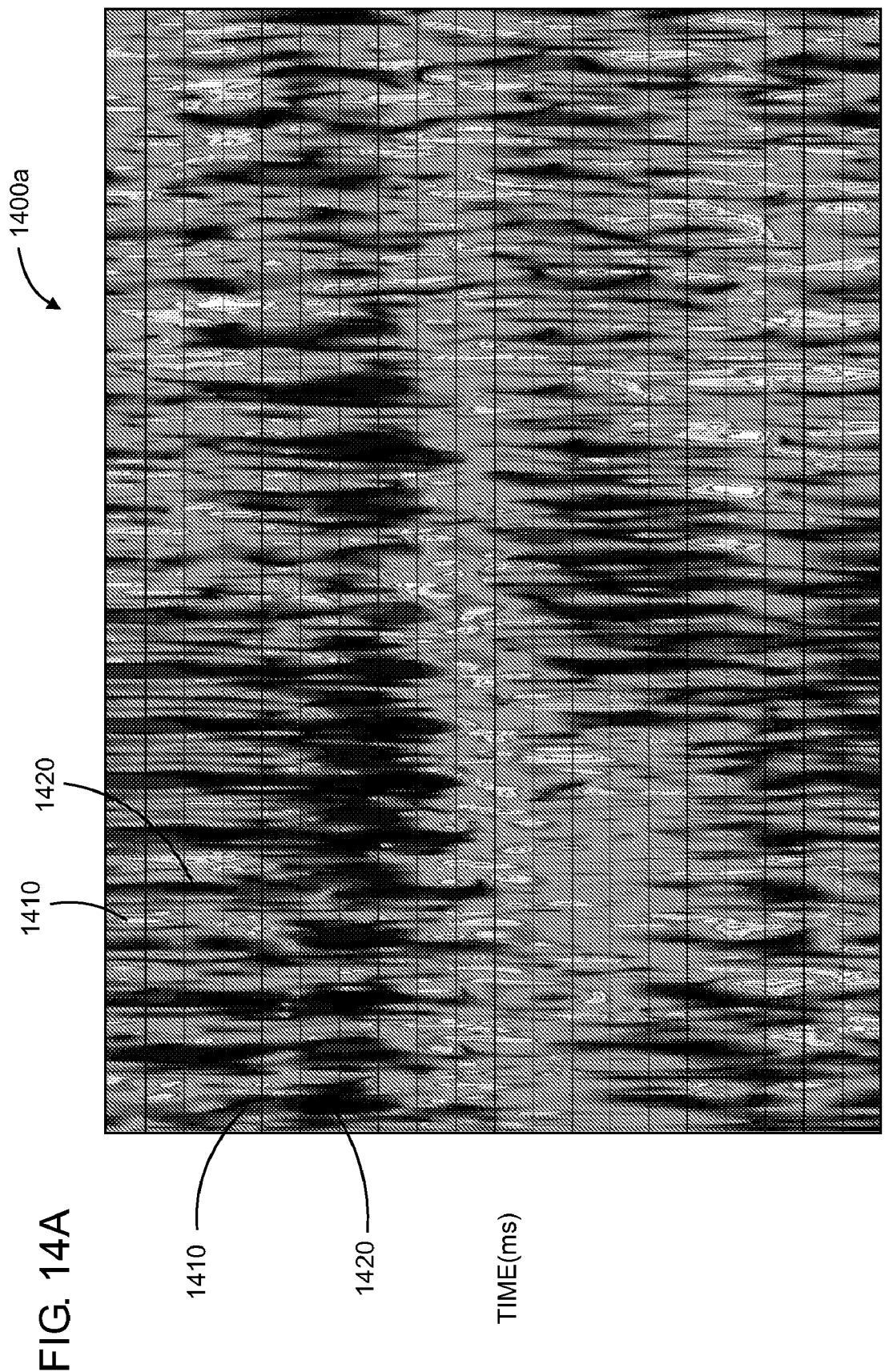
Figure 14C:
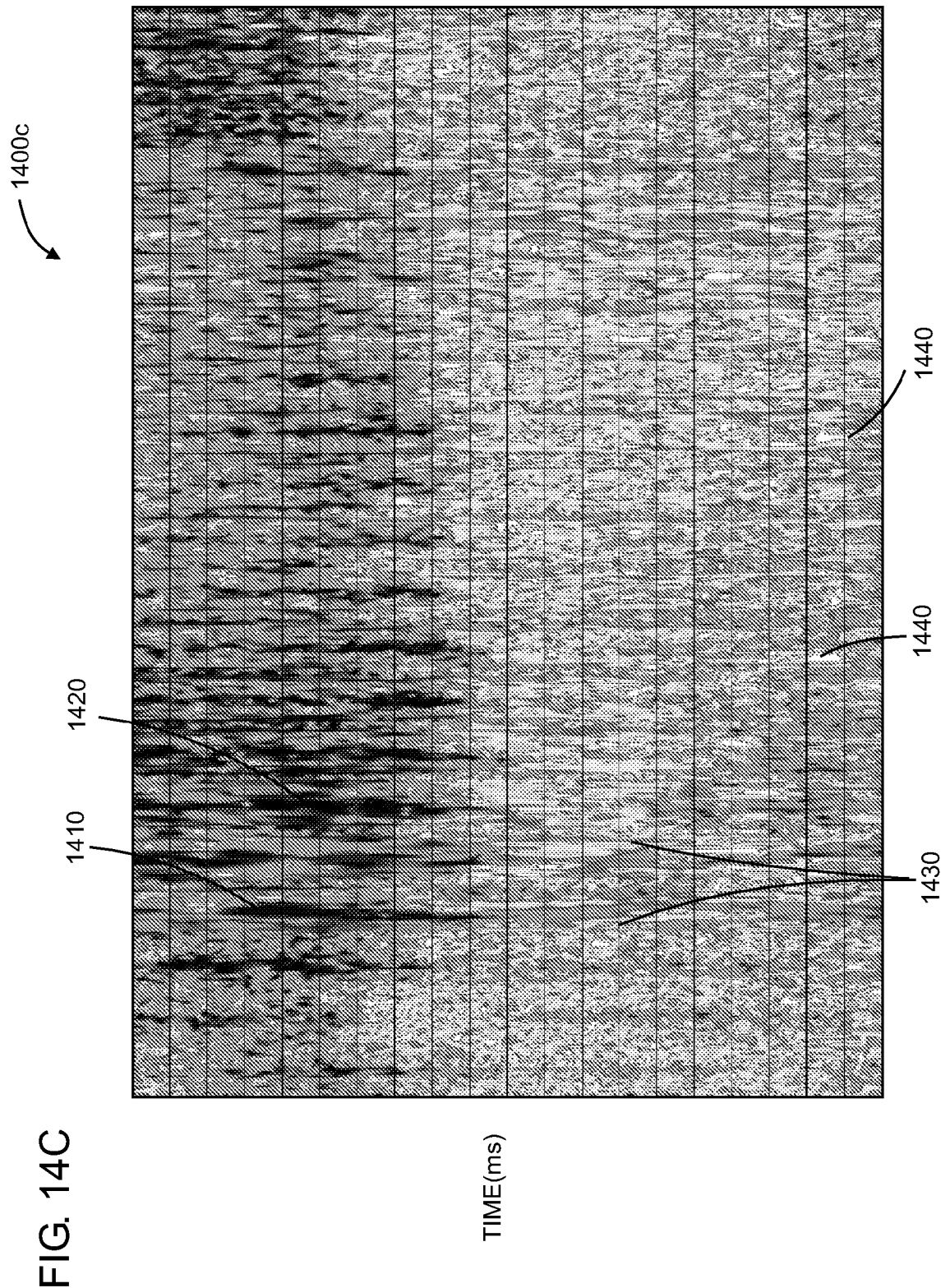

As an example, the tau-P transforms of the corresponding pair of hydrophone and geophone windows from step 108 may be divided into 4 frequency bands ($N_{fb}$=4) at step 110, although any desired number of frequency bands may be used. FIGS. 10A-D illustrate frequency bands 1 through 4, respectively, after dividing the hydrophone tau-P space 800 of FIG. 8 into four frequency bands. FIG. 10A shows only low temporal frequency, for example, and FIGS. 10B-D depict progressively higher frequencies. Likewise, FIGS. 11A-D illustrate frequency bands 1 through 4 after dividing the geophone tau-P space 900 of FIG. 9 into the same four frequency bands as FIGS. 10A-D. FIG. 11A shows that the geophone noise is most pervasive at low frequencies.

At step 112, the envelope of each frequency band for both the hydrophone and geophone tau-P data may be computed. The envelope of each $P_x$, $P_y$, Fband trace over time may be determined using any suitable method, such as envelope calculation described in Taner, M. T., F. Koehler, and R. E. Sheriff, "Complex seismic trace analysis," *Geophysics*, 44, pp. 1041-1063, 1979, herein incorporated by reference. The polarity-insensitive envelope may make use of the hydrophone envelopes as the most noise free templates possible in subsequent steps.

FIGS. 12A-D portray envelopes 1200a-d of the frequency bands of FIGS. 10A-D, respectively, for the hydrophone. These envelopes 1200a-d may function as an amplitude template that will be used as a target for corresponding geophone amplitudes. Similarly, FIGS. 13A-D portray envelopes 1300a-d of the frequency bands of FIGS. 11A-D, respectively, for the geophone. Unmatched high amplitude (noise) on the geophone envelopes 1300a-d may be substantially reduced after matching (i.e., scaling with an envelope ratio equal to a hydrophone envelope divided by a corresponding geophone envelope for each of the frequency bands in subsequent steps of the operations 100).

At step 114, an envelope ratio for each corresponding pair of envelopes (hydrophone envelope/geophone envelope) for each frequency band may be computed. Thus, for the example of four frequency bands, four envelope ratios may be calculated. For some embodiments, the envelope ratios may be graphically displayed, while in other embodiments, the envelope ratios may be used internally only.

FIGS. 14A-D illustrate envelope ratios 140a-d of the envelopes 1200a-d of the frequency bands of FIGS. 12A-D for the hydrophone to the envelopes 1300a-d of the corresponding frequency bands of FIGS. 13A-D for the geophone. In FIGS. 14A-D, darker shades may be scaled downward while lighter shades may be scaled upward once the envelope ratios 1400a-d are applied to the geophone tau-P data in subsequent steps. For example, dark gray 1410 to black 1420 in the envelope ratios 1400a-d may most likely be scaled downward, and black 1420 may be scaled downward more than 20 dB. At the higher frequencies of FIGS. 14C-D, a great deal of the tau, $P_x$, $P_y$ space of the geophone may most likely be scaled upward since there is a lot of areas shaded light gray 1430 and white 1440. This is consistent with geophone coupling deficiencies at higher frequencies.

At step 116, each geophone frequency band from step 110 may be scaled by the corresponding envelope ratio from step 114. Therefore, only amplitude of the geophone data may be adjusted; phase of the geophone data may remain intact. All of the scaled frequency bands for the geophone may be summed at step 118 in an effort to re-compose the processed frequency-decomposed tau-P data. For some embodiments, the hydrophone frequency bands, which were not scaled, from step 110 may also be summed at step 1 18 in an effort to compensate (or at least partially correct) for artifacts introduced into the processed geophone tau-P data by comparing the processed hydrophone tau-P data from step 118 to the original hydrophone 3-D tau-P transformed data from step 108 and applying a correction to the processed geophone tau-P data.

Figure 15:
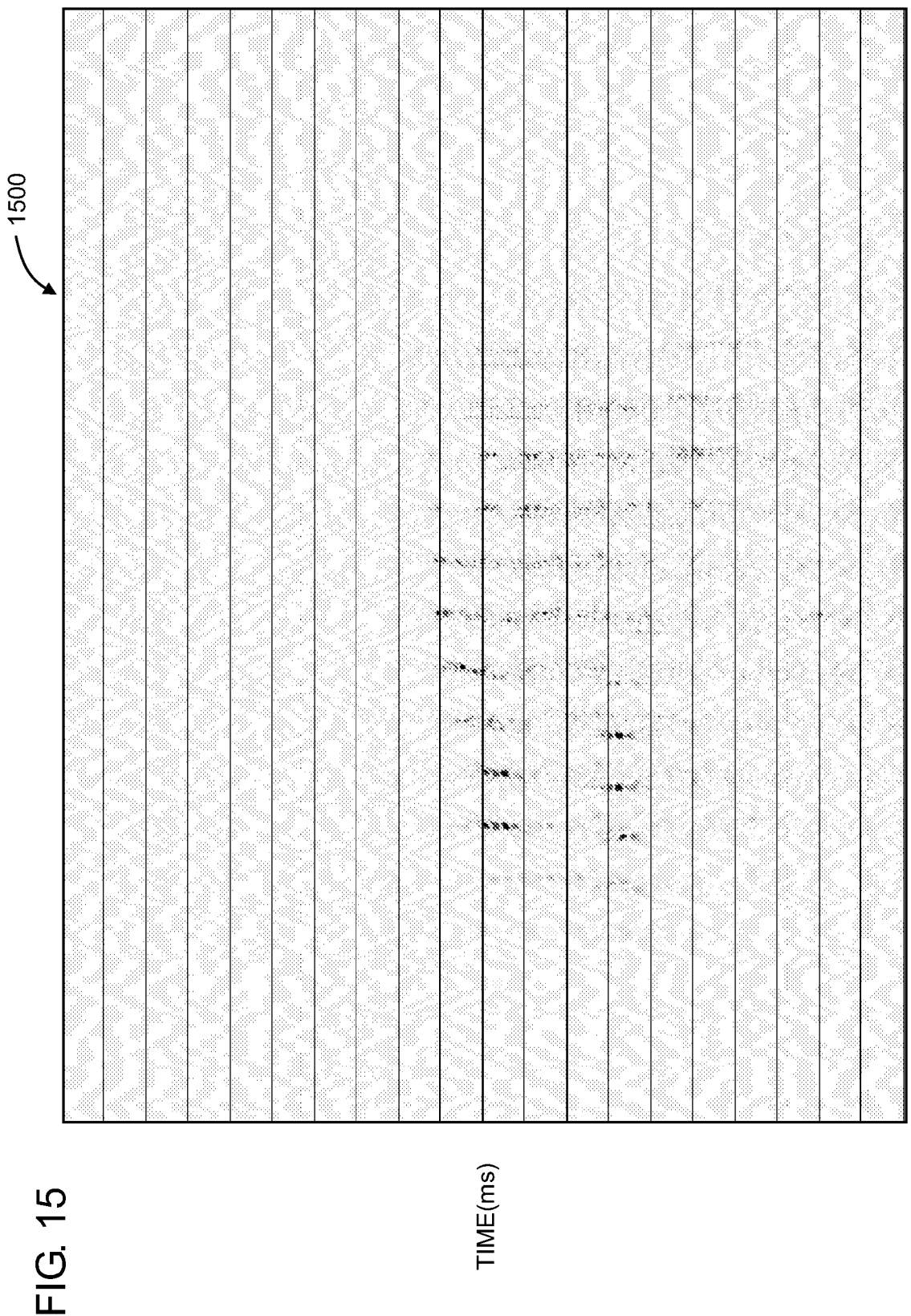
FIG. 15 illustrates reconstruction of the hydrophone data by summing all of the frequency bands from FIGS. 10A-D, in accordance with an embodiment of the present invention.
Figure 16:
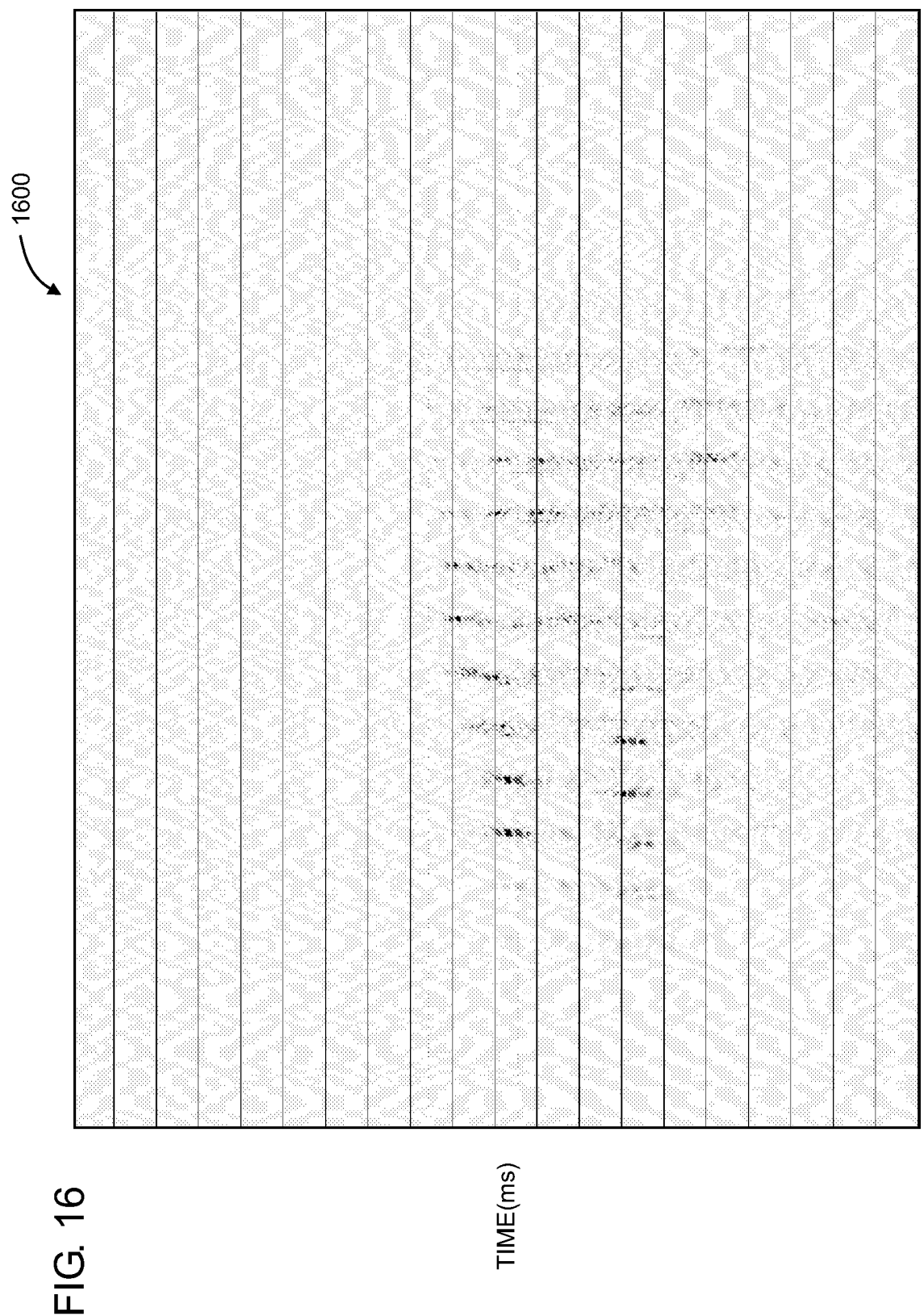
FIG. 16 illustrates reconstruction of the geophone data by scaling the frequency bands of FIGS. 11A-D by the corresponding envelope ratios of FIGS. 14A-D and summing all of the scaled frequency bands, in accordance with an embodiment of the present invention.

FIG. 15 illustrates reconstruction of the hydrophone data by summing all of the frequency bands from FIGS. 10A-D in step 118. FIG. 16 illustrates reconstruction of the geophone data by scaling the frequency bands of FIGS. 11A-D by the corresponding envelope ratios 1400a-d of FIGS. 14A-D and summing all of the scaled frequency bands. Note how the reconstructed geophone data 1600 of FIG. 16 correlates to the reconstructed hydrophone data 1500 of FIG. 15, much better than the geophone tau-P space 900 of FIG. 9.

At step 120, an inverse 3-D tau-P transform may be performed on the summed frequency bands from step 118 for both the hydrophone and geophone. For some embodiments, the inverse 3-D tau-P transform may be performed on the original hydrophone 3-D tau-P transformed data from step 108 instead on summed hydrophone frequency bands. As described above, the inverse 3-D tau-P transform may be of exactly the same computational nature as the forward 3-D tau-P transform, with the exception that the slant stack shifts are reversed.

Figure 17:
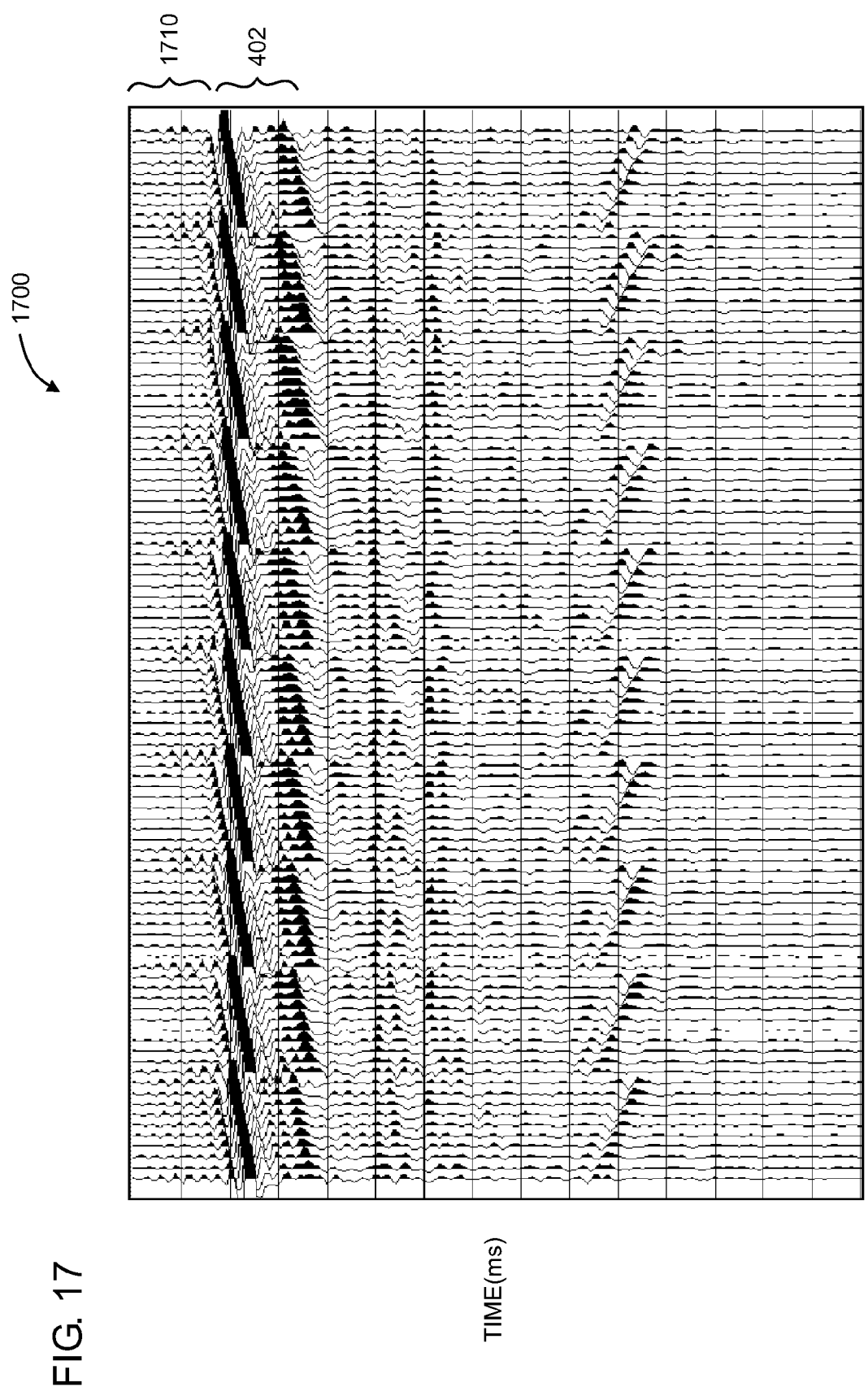
FIG. 17 is the hydrophone gather of FIG. 4 after forward and inverse tau-P transforms, in accordance with an embodiment of the present invention.

FIG. 17 is a hydrophone gather 1700 after forward and inverse 3-D tau-P transforms have been applied to the hydrophone shallow window 400 of FIG. 4 according to the operations 100 of FIG. 1. Note minor artifacts 1710 above the direct arrival 402 when compared to the original hydrophone shallow window 400 of FIG. 4.

Figure 18:
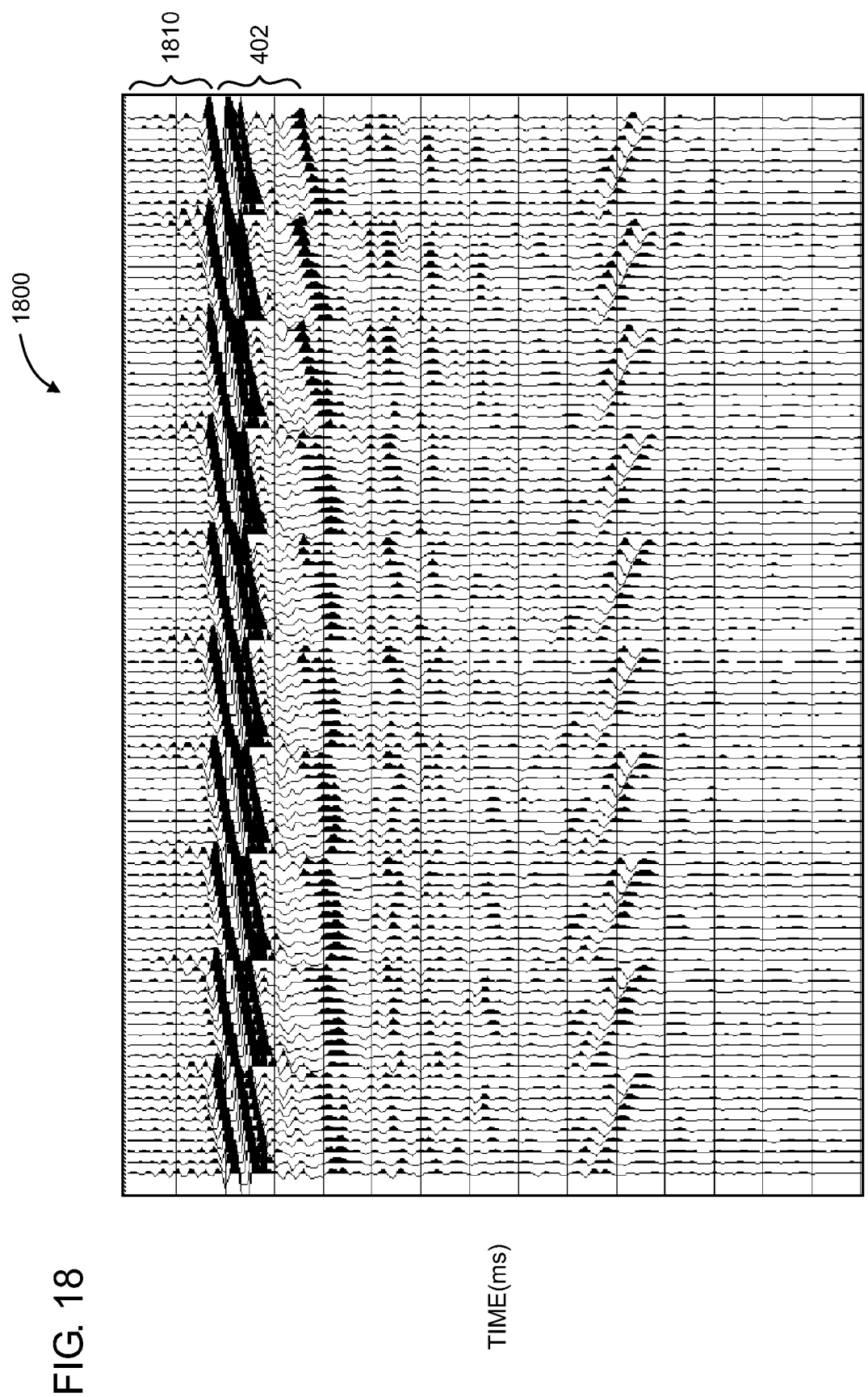
FIG. 18 is the geophone gather of FIG. 5 after a forward tau-P transform, scaling with the envelope ratios, and an inverse tau-P transform, in accordance with an embodiment of the present invention.

FIG. 18 is a geophone gather 1800 after a forward tau-P transform, scaling with the envelope ratios, and an inverse tau-P transform have been performed on the geophone shallow window 500 of FIG. 5 according to the operations 100 of FIG. 1. The processed geophone gather 1800 of FIG. 18 illustrates noise removal and mild artifacts 1810 occurring above the strong first arrival 402, but correlates well with the hydrophone gathers of FIGS. 4 and 17.

It is important to note that only transforms have been applied to the hydrophone data so that it remains, theoretically, unchanged. In other words, scaling has only been applied to the geophone data. Any artifacts of the transforms may be estimated from a comparison of the original input hydrophone and may be corrected on the processed geophone data. The hydrophone data need not be corrected since the original hydrophone gather may be used. For example, the hydrophone gathers of FIGS. 4 and 17 may be compared to determine the artifacts 1710 arising in FIG. 17 from embodiments of the invention described above. A method used to reduce or remove the artifacts 1710 from FIG. 17 may be used to correct the artifacts 1810 in the geophone gather 1800 of FIG. 18, as well.

Figure 19:
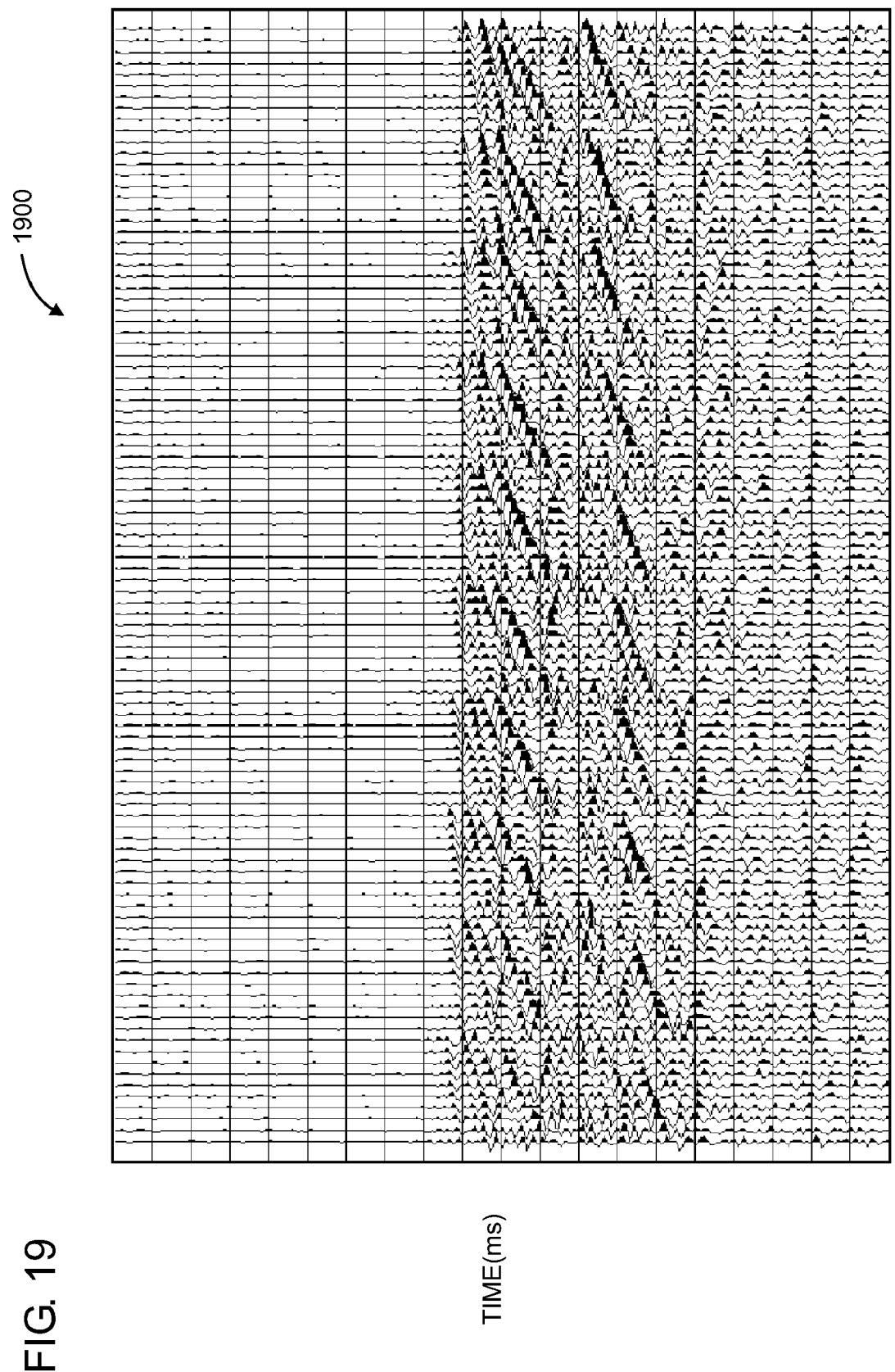
FIG. 19 is the hydrophone gather of FIG. 6 after forward and inverse tau-P transforms, in accordance with an embodiment of the present invention.
Figure 20:
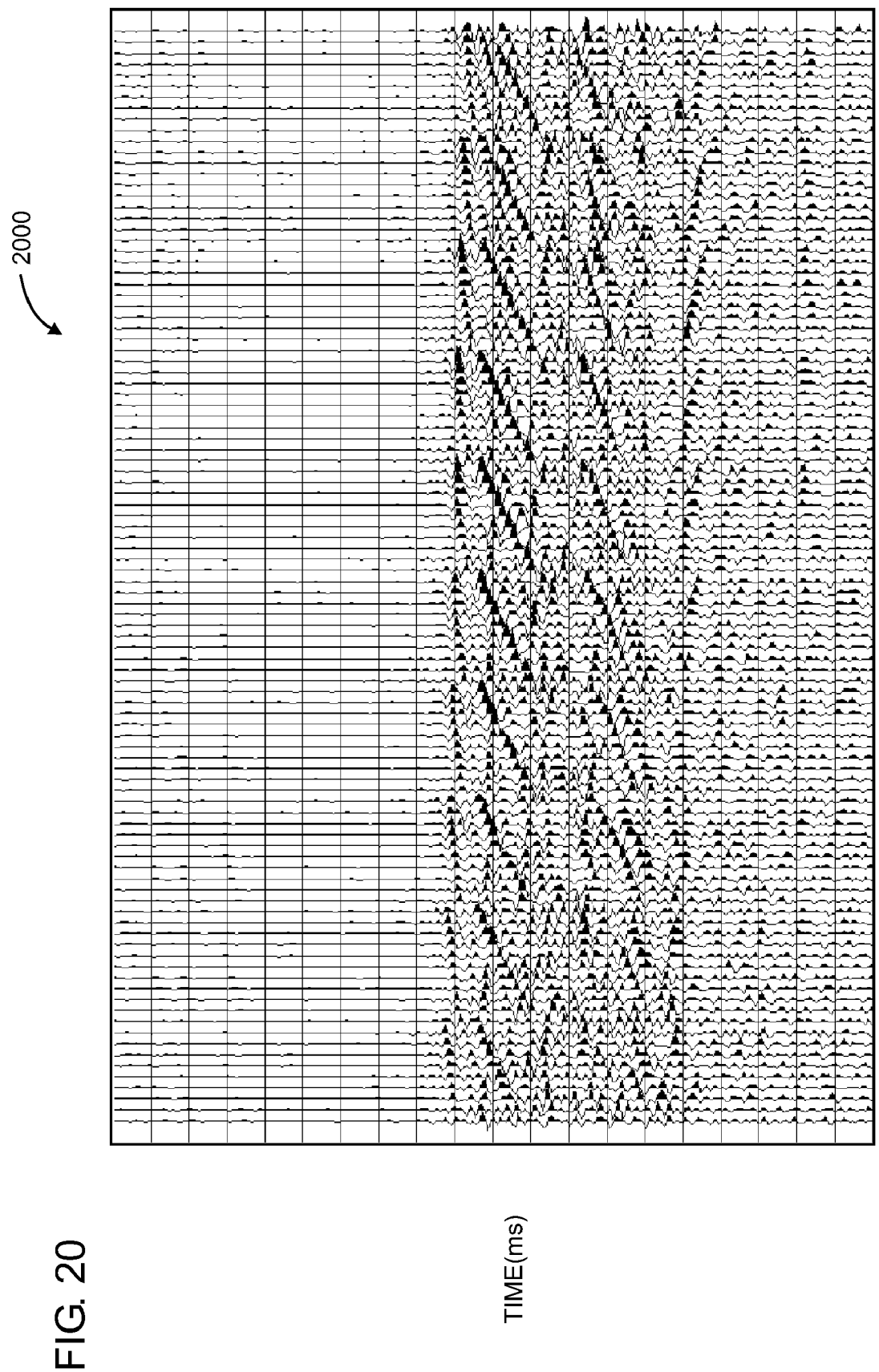
FIG. 20 is the geophone gather of FIG. 7 after a forward tau-P transform, scaling with the envelope ratios, and an inverse tau-P transform, in accordance with an embodiment of the present invention.

As another example of wavefield separation and noise removal according to embodiments of the invention, FIG. 19 is a hydrophone gather 1900 after forward and inverse tau-P transforms have been applied to the hydrophone deeper window 600 of FIG. 6 according to the operations 100 of FIG. 1. FIG. 20 is a geophone gather 2000 after a forward tau-P transform, scaling with the envelope ratios, and an inverse tau-P transform have been performed on the geophone deeper window 700 of FIG. 7 according to the operations 100 of FIG. 1. The processed geophone gather 2000 of FIG. 20 illustrates noise removal and wavefield separation from FIG. 7 and correlates well with the hydrophone gather 1900 of FIG. 19.

Once all of the operations in step 107 have been performed for all of the corresponding hydrophone and geophone windows, all or a portion of the hydrophone windows may be combined, and all or some of the geophone windows may be combined at step 122 in an effort to form a more complete view of the seismic data from a particular gather. Overlaps between the windows may be managed to not have an effect on the combinations. The combined processed windows may be output to any suitable medium for further data processing or display, such as a computer monitor or a printer.

A major concern with respect to any noise elimination technique is that it must not degrade the signal content. The technique described above relies on the fact that as long as noise and signal are separated in one of the four dimensions Tau, $P_x$, $P_y$, or frequency, the signal component should be completely unharmed. Very rarely, there may be points with perfect alignment between signal and noise in all four dimensions simultaneously. This may only occur when coherent noise is tangent to signal content and then only in the overlap in their respective spectra. Only those particular points in Tau-$P_x$-$P_y$-Fband space may suffer attenuation of both signal and noise components, leading to a graceful degradation of the effectiveness of the procedure under said conditions.

Geometry Requirements

Use of a 3-D tau-P transform may place certain restrictions on the geometry of the gather used as input. Geometry induced discontinuities in continuous geology present a significant problem to the fidelity of the transform. These may be reduced or minimized by choosing a gather that represents continuously sampled geology with continuous offset and azimuth. Most bottom-referenced geometries dictate a convenient gather with such characteristics. For swath style geometries, common receiver gathers windowed into small overlapping shot groups may be ideal. Cross spread geometries may dictate use of piecewise continuous shot sets into piecewise continuous receiver sets. Deep sea node acquisition can only be processed with windowed shots into common receivers due to the relative coarseness of receiver sampling in all directions. The techniques described above assume deep node acquisition. There may be minor complexities in the method in the case of shallow water with ghost periods less than the length of the seismic wavelet. However, these complexities are not within the scope of the invention and are not described herein.

Real Data Examples

Figure 21:
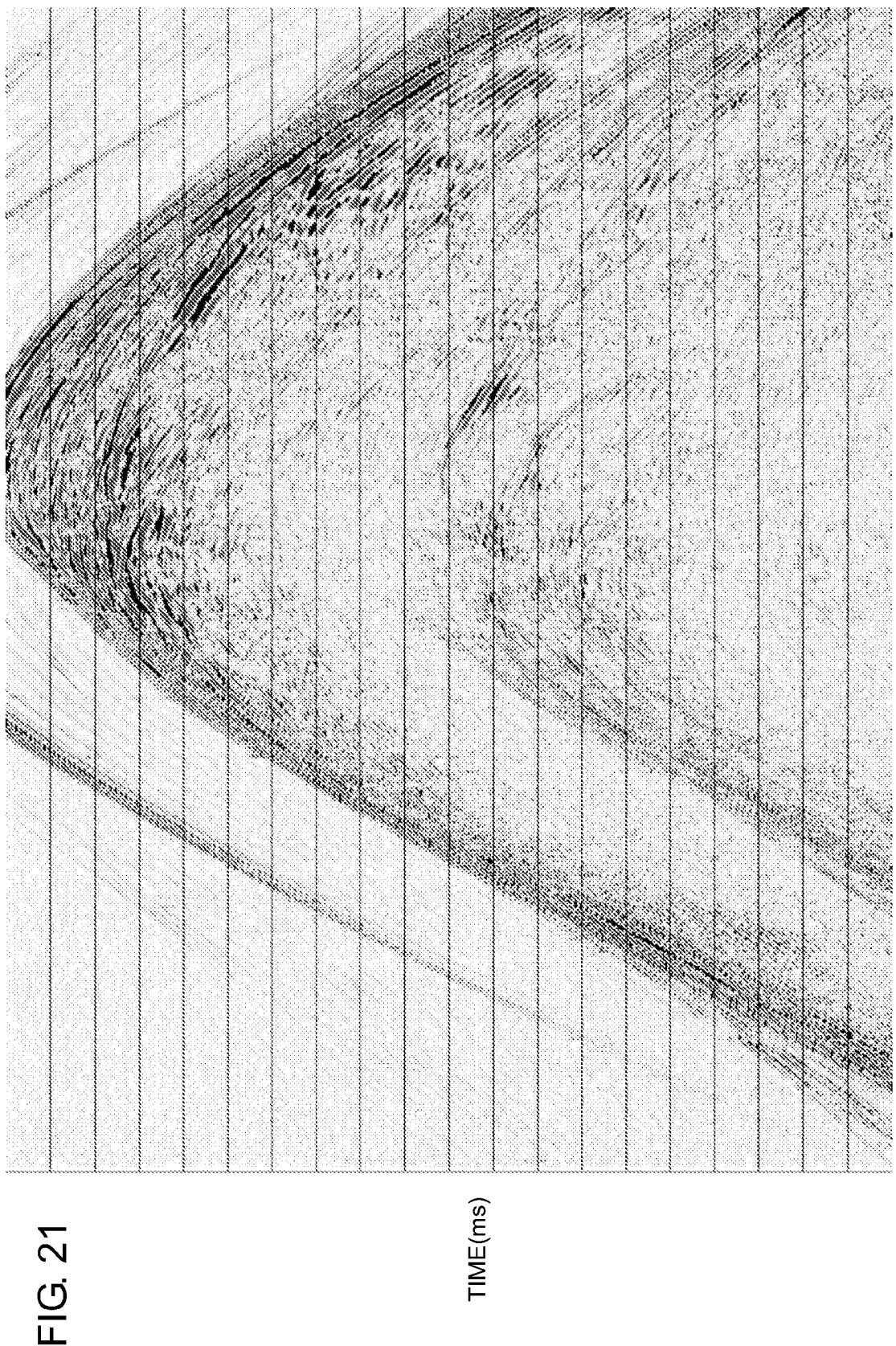
FIG. 21 illustrates a hydrophone source line at production scale, in accordance with an embodiment of the present invention.
Figure 22:
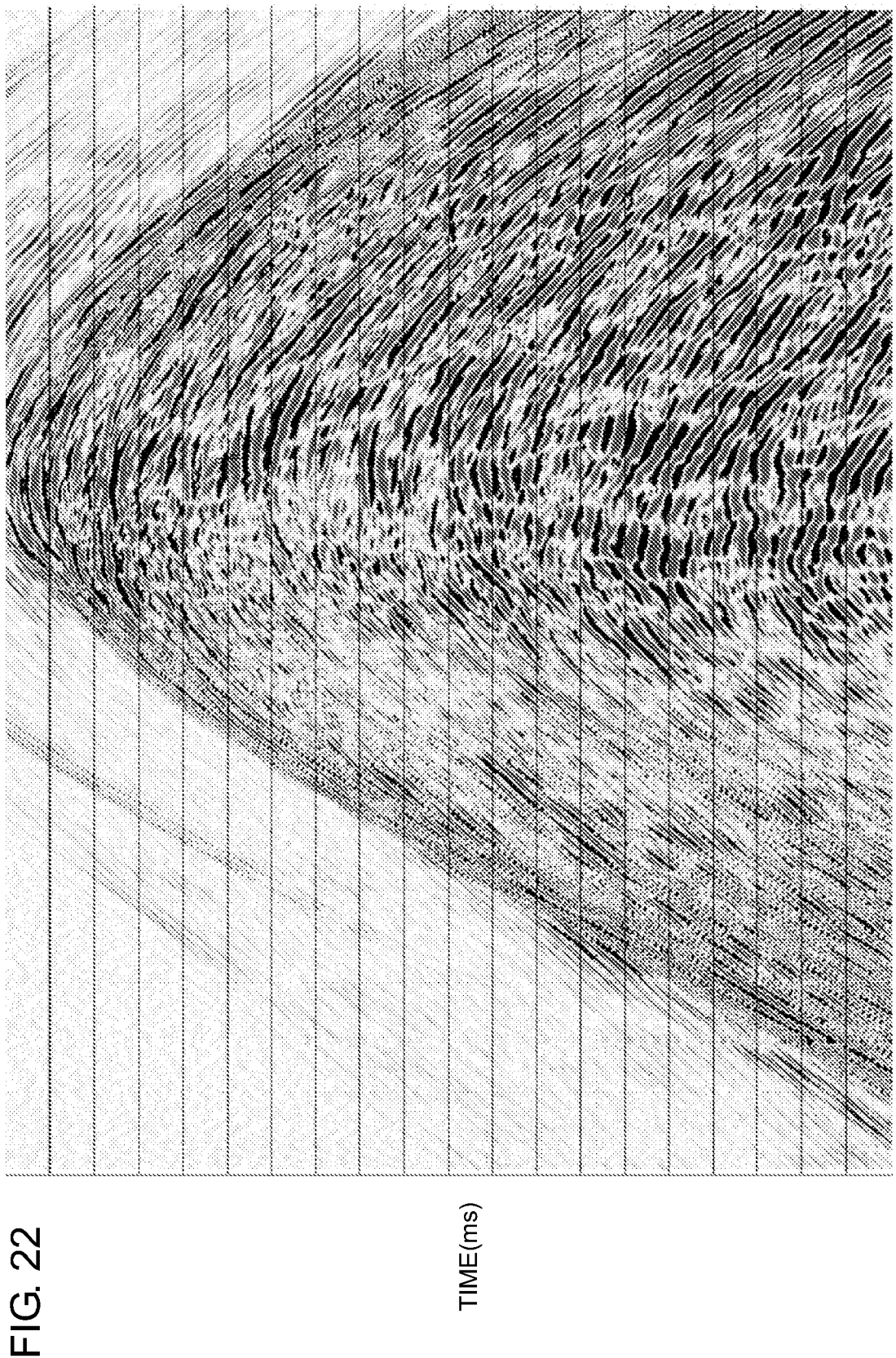
FIG. 22 illustrates a geophone source line at production scale, in accordance with an embodiment of the present invention.
Figure 23:
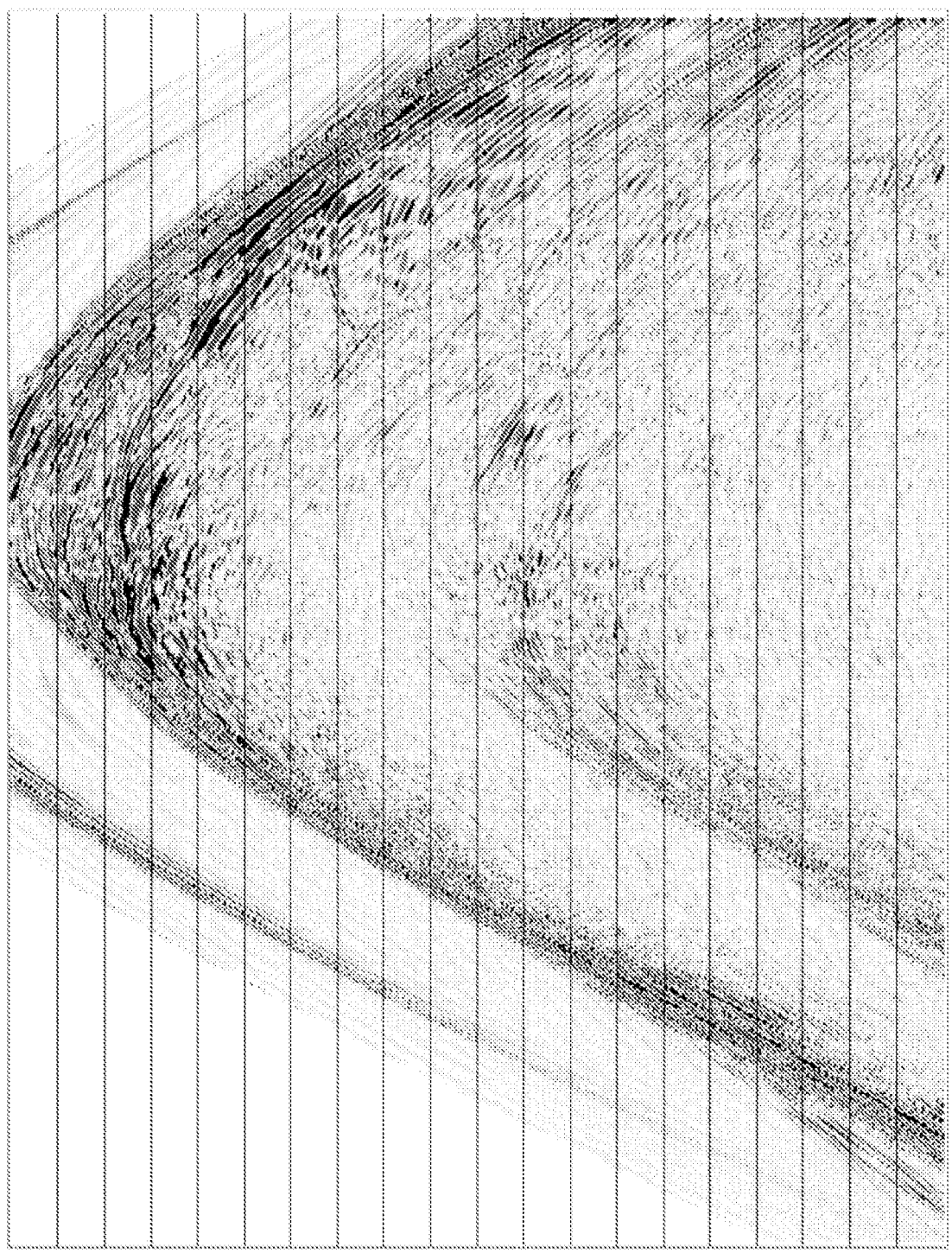
FIG. 23 illustrates the geophone source line of FIG. 22 after a forward tau-P transform, scaling with the envelope ratios, and an inverse tau-P transform, in accordance with an embodiment of the present invention.

The method of envelope ratio scaling in the tau-P domain described above has been applied at a production scale on data acquired with autonomous bottom-referenced sensors. These sensors exhibited varying amounts of V(z) noise with varying amplitudes and apparent structural complexity of the noise inducing shear arrivals. FIGS. 21 and 22 illustrate the comparison between the relatively noise free hydrophone and the V(z)-noise-contaminated vertical geophone, respectively. It is important to note that the geophone has been rotated to within 2 degrees of vertical and the noise is not a phase match to shear waves observed on the horizontal components. FIG. 23 shows the result of application of the wavefield matching process performed on 3-D data with a four-dimensional decomposition as described above.

Conclusion

A method for managing dual sensor data that enhances wavefield separation while virtually eliminating geophone-specific noise has been presented and demonstrated. Furthermore, this technique may be indifferent to the cause of the geophone noise and will suppress it as long as the geophone noise is not tangent to signal content.

While the foregoing is directed to embodiments of the present invention, other and further embodiments of the invention may be devised without departing from the basic scope thereof, and the scope thereof is determined by the claims that follow.

The invention claimed is:

1. A method for extracting wavefields from a hydrophone gather and a geophone gather, comprising:
   windowing the hydrophone and geophone gathers;
   performing a three-dimensional (3-D) time-slowness (tau-P) transform on each of the windowed gathers;
   dividing each tau-P transform into N frequency bands to form N hydrophone frequency bands and N geophone frequency bands;
   determining an envelope of each frequency band for the N hydrophone frequency bands and for the N geophone frequency bands;
   determining an envelope ratio for each frequency band, wherein the envelope ratio for the Nth frequency band is a ratio of the envelope for the Nth hydrophone frequency band to the envelope for the Nth geophone frequency band;
   scaling each of the geophone frequency bands by the corresponding envelope ratio for each frequency band;
   summing the scaled geophone frequency bands;
   performing an inverse tau-P transform on the summed, scaled geophone frequency bands; and
   outputting the inverse-transformed geophone gathers to a display.

2. The method of claim 1, further comprising phase adjusting the geophone gather before windowing the geophone gather.

3. The method of claim 1, wherein performing the 3-D tau-P transform comprises applying a Radon transform to each of the windowed gathers.

4. The method of claim 1, further comprising:
   summing the N hydrophone frequency bands; and
   performing an inverse tau-P transform on the summed hydrophone frequency bands.

5. The method of claim 4, further comprising:
   comparing the inverse tau-P transformation for the hydrophone to the windowed hydrophone gather to determine one or more artifacts; and
   applying the artifacts to the inverse tau-P transformation for the geophone to produce a corrected windowed geophone gather.

6. The method of claim 1, wherein dividing each tau-P transform into N frequency bands comprises applying a continuous wavelet transform (CWT).

7. The method of claim 5, wherein the CWT comprises Morlet wavelets sampled linearly in logarithm of frequency.

8. The method of claim 1, wherein the hydrophone and geophone gathers are common receiver gathers.

9. A method for extracting wavefields from a hydrophone gather and a geophone gather, comprising:
   windowing the hydrophone and geophone gathers to form pairs of corresponding hydrophone and geophone windowed gathers;
   for each pair of corresponding hydrophone and geophone windowed gathers, performing operations comprising:
      performing a three-dimensional (3-D) time-slowness (tau-P) transform on each of the windowed gathers;
      dividing each tau-P transform into N frequency bands to form N hydrophone frequency bands and N geophone frequency bands;
      determining an envelope of each frequency band for the N hydrophone frequency bands and for the N geophone frequency bands;
      determining an envelope ratio for each frequency band, wherein the envelope ratio for the Nth frequency band is a ratio of the envelope for the Nth hydrophone frequency band to the envelope for the Nth geophone frequency band;
      scaling each of the geophone frequency bands by the corresponding envelope ratio for each frequency band;
      summing the scaled geophone frequency bands; and
      performing an inverse tau-P transform on the summed, scaled geophone frequency bands;
   combining the inverse-transformed windowed geophone gathers; and
   outputting the combined windowed geophone gathers to a display.

10. The method of claim 9, further comprising phase adjusting the geophone gather before windowing the geophone gather.

11. The method of claim 9, the operations further comprising:
   summing the N hydrophone frequency bands; and
   performing an inverse tau-P transform on the summed hydrophone frequency bands.

12. The method of claim 11, further comprising combining the inverse-transformed windowed hydrophone gathers.

13. The method of claim 12, further comprising:
comparing the combined windowed hydrophone gathers to the hydrophone gather to determine one or more artifacts; and
applying the artifacts to the combined windowed geophone gathers to produce a corrected combined windowed geophone gather.

14. A non-transitory computer-readable medium containing instructions for extracting wavefields from a hydrophone gather and a geophone gather, which, when executed, causes a computer processor to perform operations comprising:
windowing the hydrophone and geophone gathers;
performing a three-dimensional (3-D) time-slowness (tau-P) transform on each of the windowed gathers;
dividing each tau-P transform into N frequency bands to form N hydrophone frequency bands and N geophone frequency bands;
determining an envelope of each frequency band for the N hydrophone frequency bands and for the N geophone frequency bands;
determining an envelope ratio for each frequency band, wherein the envelope ratio for the Nth frequency band is a ratio of the envelope for the Nth hydrophone frequency band to the envelope for the Nth geophone frequency band;
scaling each of the geophone frequency bands by the corresponding envelope ratio for each frequency band;
summing the scaled geophone frequency bands; and
performing an inverse tau-P transform on the summed, scaled geophone frequency bands.

15. The computer-readable medium of claim 14, wherein the operations further comprise phase adjusting the geophone gather before windowing the geophone gather.

16. The computer-readable medium of claim 14, wherein performing the 3-D tau-P transform comprises applying a Radon transform each of the windowed gathers.

17. The computer-readable medium of claim 14, wherein the operations further comprise:
summing the N hydrophone frequency bands; and
performing an inverse tau-P transform on the summed hydrophone frequency bands.

18. The computer-readable medium of claim 14, wherein dividing each tau-P transform into N frequency bands comprises applying a continuous wavelet transform (CWT).

19. The computer-readable medium of claim 18, wherein the CWT comprises Morlet wavelets sampled linearly in logarithm of frequency.

20. The computer-readable medium of claim 14, wherein the hydrophone and geophone gathers are common receiver gathers.

* * * * *